United States Patent
Kanari et al.

(10) Patent No.: US 9,025,125 B2
(45) Date of Patent: May 5, 2015

(54) DISPLAY DEVICE AND LIGHT BARRIER ELEMENT

(75) Inventors: Yuzo Kanari, Aichi (JP); Hironao Tanaka, Kanagawa (JP); Amane Higashi, Aichi (JP); Harumi Okuno, Aichi (JP); Masayuki Ito, Aichi (JP)

(73) Assignee: Japan Display Inc., Tokyo (JP)

( * ) Notice: Subject to any disclaimer, the term of this patent is extended or adjusted under 35 U.S.C. 154(b) by 382 days.

(21) Appl. No.: 13/403,626

(22) Filed: Feb. 23, 2012

(65) Prior Publication Data

US 2012/0236237 A1 Sep. 20, 2012

(30) Foreign Application Priority Data

Mar. 15, 2011 (JP) ................ 2011-056691

(51) Int. Cl.
| | | |
|---|---|---|
| G02F 1/1335 | (2006.01) | |
| G02F 1/1339 | (2006.01) | |
| G02B 27/22 | (2006.01) | |
| H04N 13/04 | (2006.01) | |
| G02F 1/1347 | (2006.01) | |

(52) U.S. Cl.
CPC ........ *G02B 27/2214* (2013.01); *H04N 13/0409* (2013.01); *G02F 1/13392* (2013.01); *G02F 1/13394* (2013.01); *G02F 1/13471* (2013.01); *G02F 2001/13396* (2013.01)

(58) Field of Classification Search
USPC .......................................... 349/106, 155, 156
See application file for complete search history.

(56) References Cited

U.S. PATENT DOCUMENTS

| | | | | |
|---|---|---|---|---|
| 5,978,061 | A * | 11/1999 | Miyazaki et al. ............. | 349/155 |
| 7,136,139 | B2 * | 11/2006 | Nam et al. .................... | 349/189 |
| 7,375,790 | B2 * | 5/2008 | Yun et al. ...................... | 349/156 |
| 7,492,435 | B2 * | 2/2009 | Jeon ............................ | 349/155 |
| 8,724,071 | B2 * | 5/2014 | Hashimoto ................... | 349/156 |
| 2005/0052529 | A1 | 3/2005 | Mashitani | |
| 2007/0030438 | A1 | 2/2007 | Chiang | |
| 2009/0161059 | A1 | 6/2009 | Emig et al. | |
| 2010/0118254 | A1 * | 5/2010 | Hashimoto ................... | 349/155 |

FOREIGN PATENT DOCUMENTS

| | | |
|---|---|---|
| EP | 1 898 651 | 3/2008 |
| JP | 2005-091834 | 4/2005 |
| JP | 2005-181668 | 7/2005 |
| JP | 2005-258013 | 9/2005 |
| WO | 2004/003627 | 1/2004 |

OTHER PUBLICATIONS

European Search Report issued on Jul. 5, 2012, in connection with counterpart EP Application No. 12 00 1405.
Japanese Office Examination Report issued in connection with related Japanese patent application No. 2011-056691 dated Oct. 21, 2014.

* cited by examiner

*Primary Examiner* — Huyen Ngo
(74) *Attorney, Agent, or Firm* — Dentons US LLP

(57) ABSTRACT

A display device includes a display section, and a light barrier element. The light barrier element includes a pair of substrates, a liquid crystal layer that is provided between the pair of substrates and has a plurality of sub-regions that transmit or block light, and a plurality of spacers provided between the pair of substrates. The plurality of spacers are randomly arranged in part or all of a region in surfaces of the substrates.

13 Claims, 18 Drawing Sheets

(LIGHT OUTPUT SIDE)

(LIGHT INPUT SIDE)

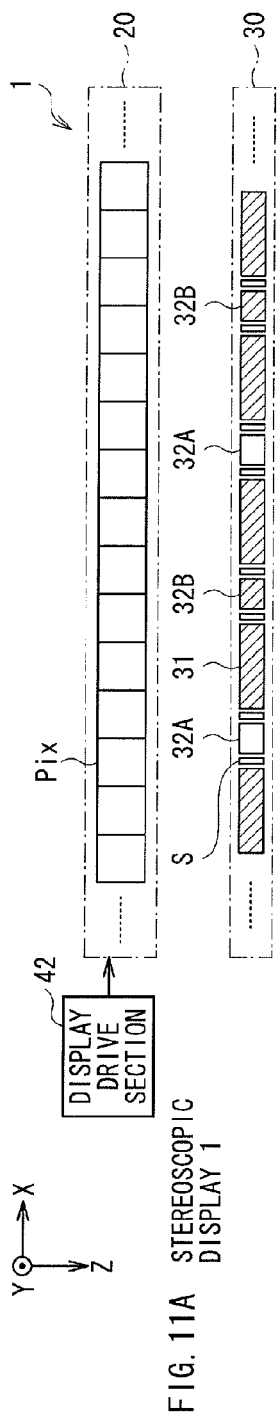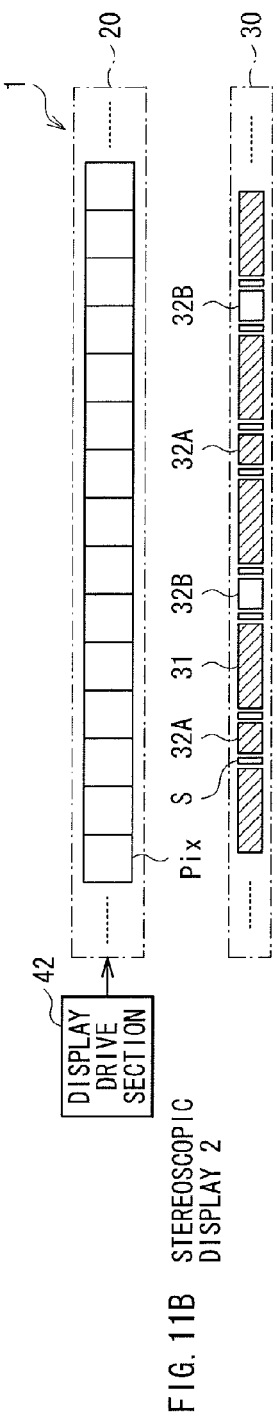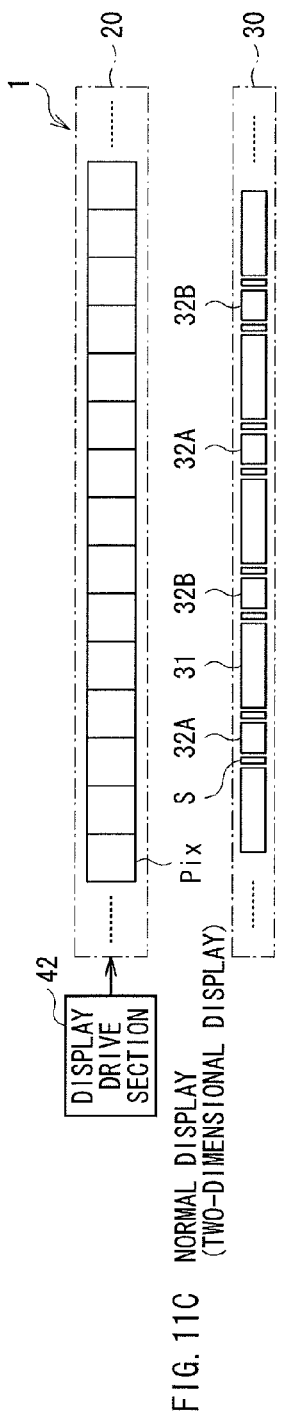
FIG. 11A STEREOSCOPIC DISPLAY 1
FIG. 11B STEREOSCOPIC DISPLAY 2
FIG. 11C NORMAL DISPLAY (TWO-DIMENSIONAL DISPLAY)

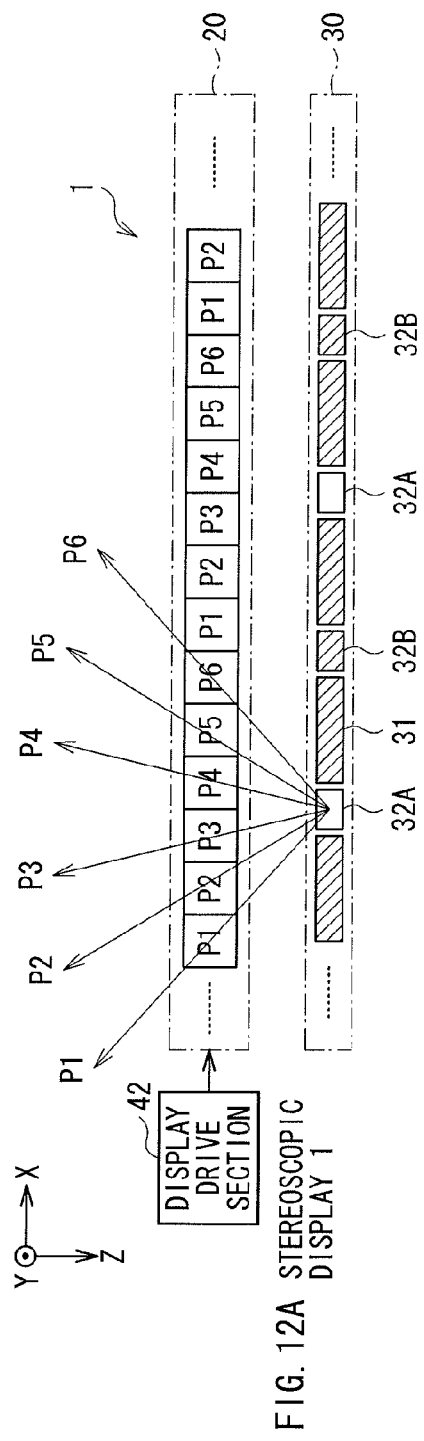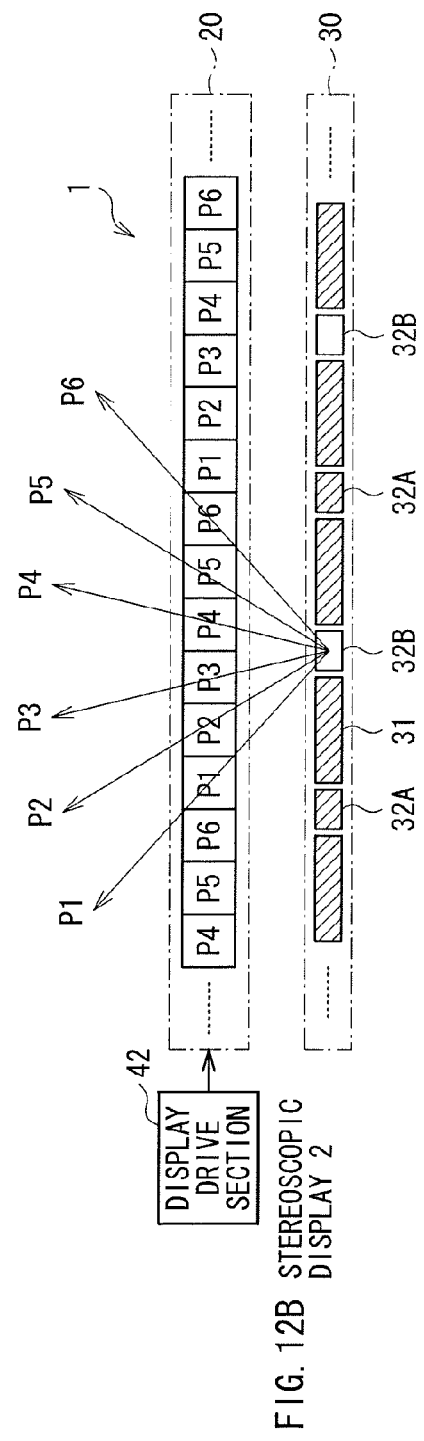
FIG. 12A STEREOSCOPIC DISPLAY 1
FIG. 12B STEREOSCOPIC DISPLAY 2

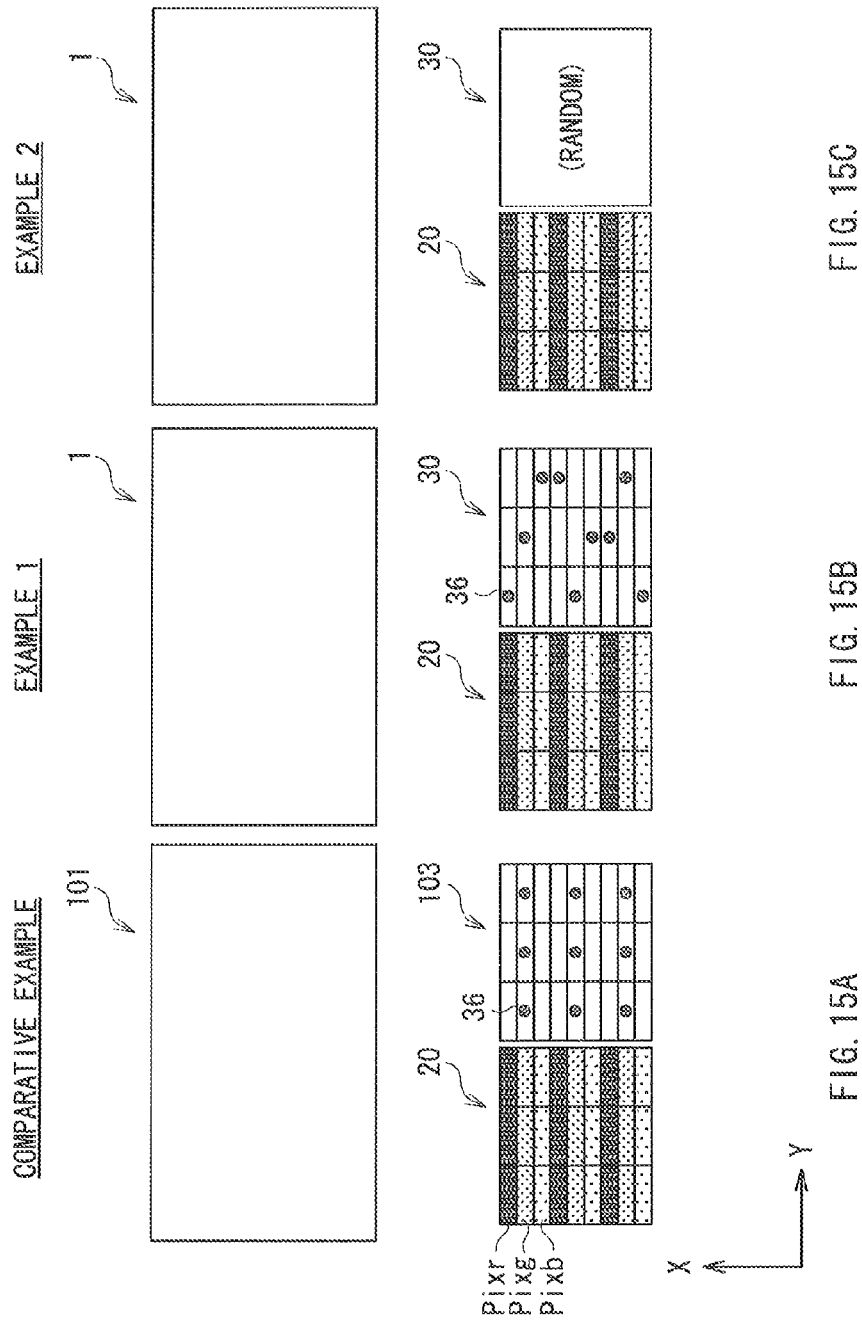

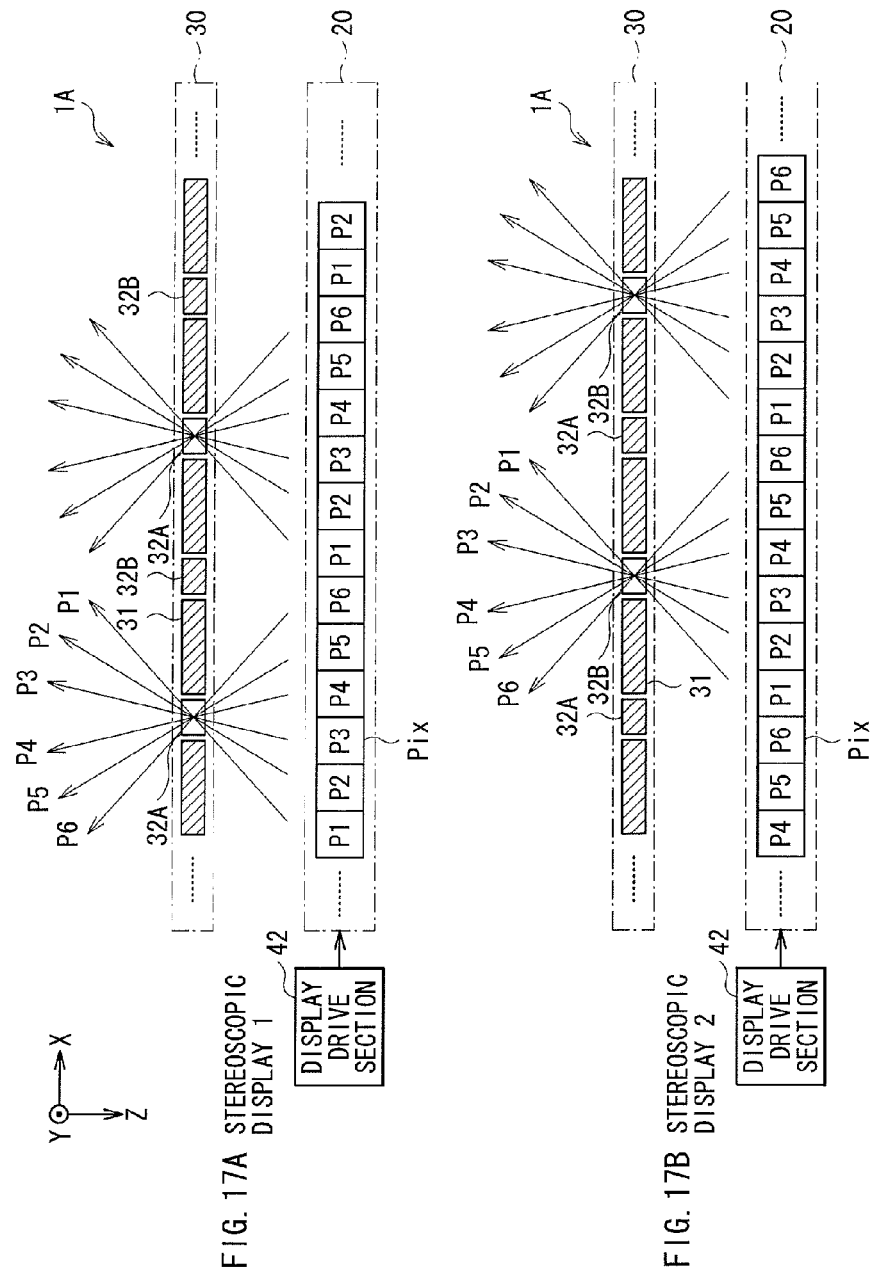
FIG. 17A STEREOSCOPIC DISPLAY 1
FIG. 17B STEREOSCOPIC DISPLAY 2

DISPLAY DEVICE AND LIGHT BARRIER ELEMENT

BACKGROUND

The present disclosure relates to a display device that may perform stereoscopic display with a parallax barrier method, and to a light barrier element used for such a display device.

Recently, a display device (stereoscopic display device) that may achieve stereoscopic display has been noticed. The stereoscopic display shows a left-eye image and a right-eye image with a parallax therebetween (with different eye-points). A viewer may recognize a deep stereoscopic image through viewing the respective images with his two eyes. In addition, a display device has been developed, which may display three or more images with parallaxes therebetween to provide a more natural stereoscopic image to a viewer.

Such a stereoscopic display device is, for example, of a lenticular lens type or a parallax barrier type (for example, see Japanese Unexamined Patent Application Publication No. 2005-91834 and WO 2004/03627). In such types of stereoscopic display device, a plurality of images (eyepoint images) with a parallax therebetween are displayed at a time, and a viewer views different images depending on a relative positional-relationship (an angle) between the display device and the viewpoint of the viewer.

SUMMARY

A light barrier element of the parallax-barrier-type stereoscopic display device is typically configured of liquid crystal (a liquid crystal barrier). In the liquid crystal barrier (liquid crystal barrier element), liquid crystal molecules are rotated depending on applied voltages, so that a refractive index of such a rotated-molecule portion is changed, leading to light modulation. As a result, light is controlled to be transmitted or blocked.

While various attempts have been made to achieve high image quality for such a stereoscopic display device including the liquid crystal barrier element, it is desired to propose a method of achieving a further improvement in image quality.

It is desirable to provide a display device that are capable of improving image quality, and a light barrier element used for such a display device.

A light barrier element according to an embodiment of the disclosure includes a pair of substrates, a liquid crystal layer that is provided between the pair of substrates and has a plurality of sub-regions that transmit or block light, and a plurality of spacers provided between the pair of substrates. The plurality of spacers are randomly arranged in part or all of a region in surfaces of the substrates.

A display device according to the embodiment of the disclosure includes a display section and the light barrier element of the embodiment of the disclosure.

In the light barrier element and the display device according to the embodiments of the disclosure, the plurality of spacers provided between the pair of substrates are randomly arranged in part or all of the region in the surfaces of the substrates. This suppresses unevenness in luminance due to a moire phenomenon (occurrence of an interference fringe) compared with the case where a plurality of spacers are non-randomly (periodically, or regularly) arranged.

According to the light barrier element and the display device according to the embodiments of the disclosure, since the plurality of spacers are randomly arranged in part or all of the region in the surfaces of the substrates, the unevenness in luminance due to the moire phenomenon is suppressed, leading to an improvement in display quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 11A to 11C are schematic views for explaining display operation of the stereoscopic display device shown in FIG. 2.

FIGS. 12A and 12B are schematic views for explaining stereoscopic display operation of the stereoscopic display device shown in FIG. 2.

FIGS. 15A to 15C illustrate exemplary arrangement configurations of spacers in the liquid crystal barriers and exemplary display images to be viewed in stereoscopic display devices according to Examples and the comparative example.

FIGS. 17A and 17B are schematic views for explaining stereoscopic display operation of the stereoscopic display device shown in FIGS. 16A and 16B.

DETAILED DESCRIPTION OF EMBODIMENTS

Hereinafter, an embodiment of the disclosure will be described in detail with reference to drawings. Description is made in the following order.

1. Embodiment (example where spacers are randomly arranged in a liquid crystal barrier)
2. Modifications
   Modification 1 (example where the liquid crystal barrier and a display section are disposed in a reversed order)
   Modifications 2 to 4 (other configuration examples of opening-and-closing sections of the liquid crystal barrier)
   Modifications 5 and 6 (other configuration examples of the spacers and the like in the liquid crystal barrier)
   Other modifications

[Embodiment]
[General Configuration of Stereoscopic Display Device 1]

Figure 1:
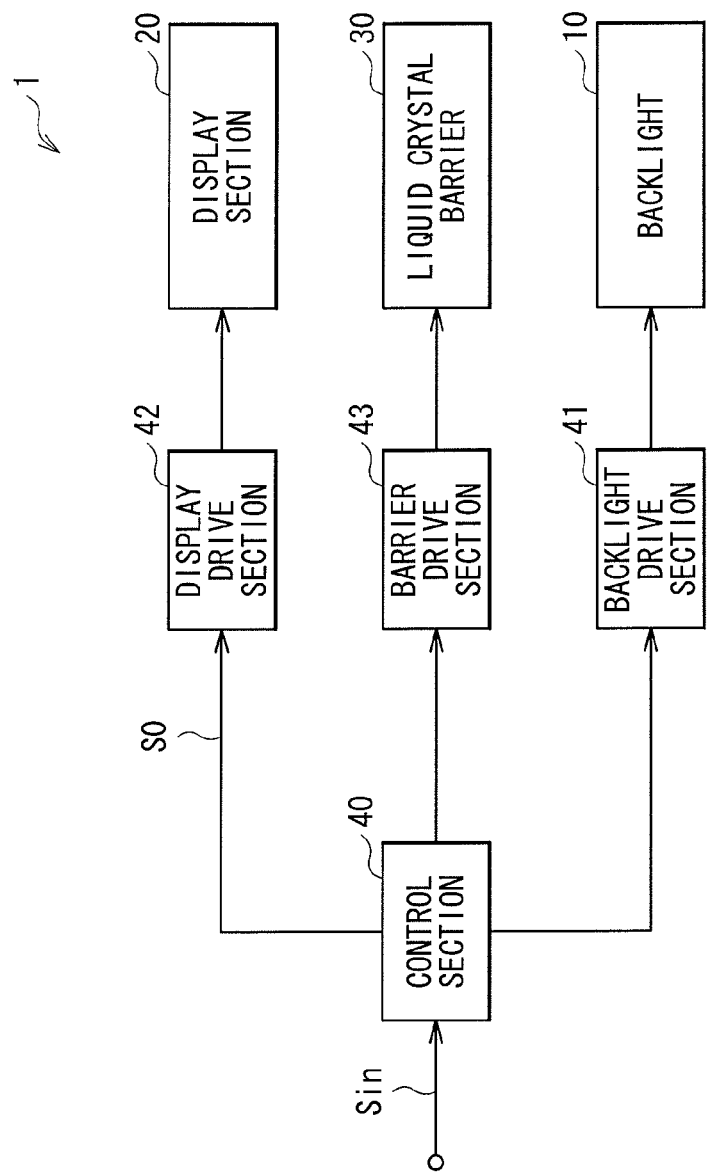
FIG. 1 is a block diagram illustrating an exemplary overall configuration of a stereoscopic display device according to an embodiment of the disclosure.
Figure 2A:
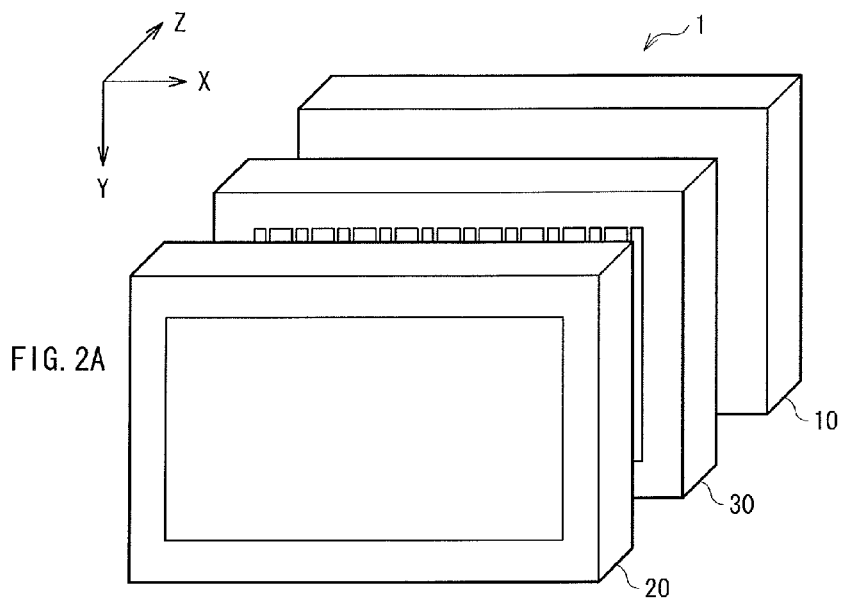
FIGS. 2A and 2B respectively are an exploded perspective view and a side view illustrating the exemplary overall configuration of the stereoscopic display device shown in FIG. 1.
Figure 2B:
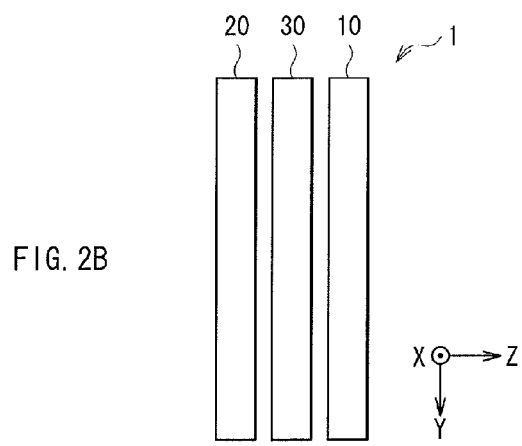

FIG. 1 is a block diagram illustrating a general configuration of a stereoscopic display device (stereoscopic display device 1) according to an embodiment of the disclosure. FIGS. 2A and 2B are an exploded perspective view (FIG. 2A) and a side view (Y-Z side view: FIG. 2B), respectively, illustrating the general configuration of the stereoscopic display device 1. The stereoscopic display device 1 is allowed to perform stereoscopic display (three-dimensional display) by a parallax barrier method on the basis of a video signal Sin input from an external unit.

The stereoscopic display device 1 includes a backlight 10, a display section 20, a liquid crystal barrier 30 (a light barrier element, or a liquid crystal barrier element), a control section 40, a backlight drive section 41, a display drive section 42, and a barrier drive section 43, as shown in FIG. 1. In the stereoscopic display device 1, the backlight 10, the liquid crystal barrier 30, and the display section 20 are disposed in this order along a Z-axis direction, as shown in FIGS. 2A and 2B. That is, light is emitted from the backlight 10 and received by a viewer through the liquid crystal barrier 30 and the display section 20 in this order. The liquid crystal barrier 30 and the display section 20 are attached to each other with a predetermined distance, for example, with a resin layer (including UV-curing resin or thermosetting resin) or an air layer (space) interposed therebetween, allowing an appropriate viewing distance for stereoscopic display to be controlled.

The control section 40 generates and supplies a control instruction to each of the backlight drive section 41, the display drive section 42, and the barrier drive section 43 on the basis of the video signal Sin, and controls the sections to operate in synchronization with one another. Specifically, the control section 40 supplies a backlight control instruction to the backlight drive section 41, supplies a video signal S0 based on the video signal Sin to the display drive section 42, and supplies a barrier control instruction to the barrier drive section 43. For stereoscopic display by the stereoscopic display device 1, the video signal S0 includes, for example, a plurality of kinds of eyepoint images as described below.

[Configurations of Backlight 10 and Backlight Drive Section 41]

The backlight 10, which corresponds to a light source that emits light to the display section 20, is configured of a light emitting element such as a cold cathode fluorescent lamp (CCFL) and light emitting diodes (LEDs).

The backlight drive section 41 drives the backlight 10 on the basis of the backlight control instruction supplied from the control section 40 (emission drive).

[Configurations of Display Section 20 and Display Drive Section 42]

Figure 3:
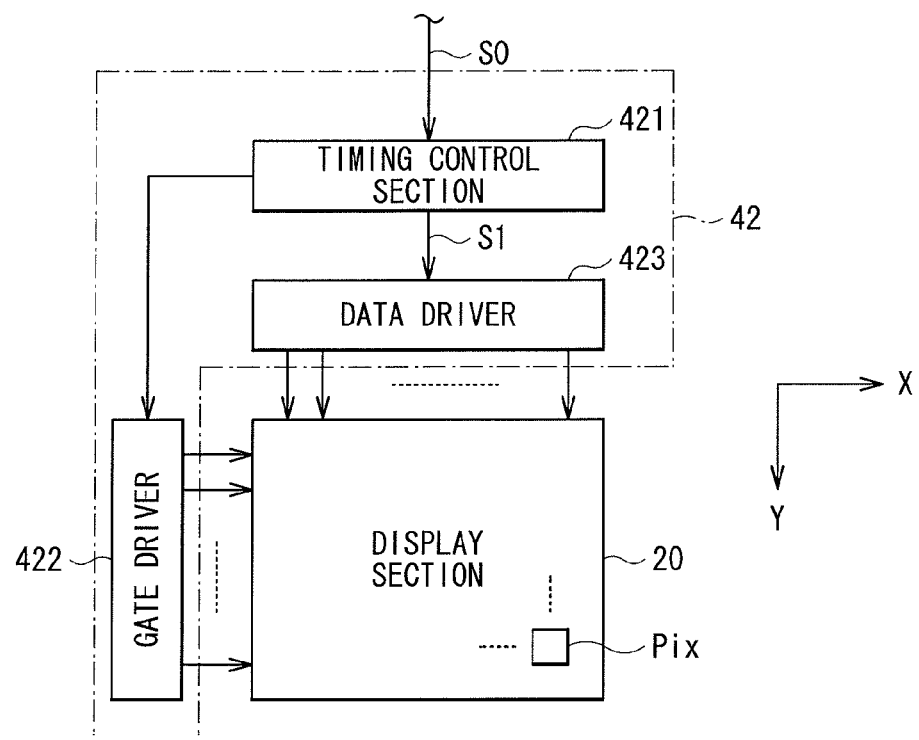
FIG. 3 is a block diagram illustrating an exemplary detailed configuration of a display section and a display drive section shown in FIG. 1.

The display section 20 includes a liquid-crystal display section that modulates light, which is emitted from the backlight 10 and transmitted by the liquid crystal barrier 30, on the basis of a display control signal supplied from the display control section 42 described below, and thus performs video display on the basis of the video signal S0. The display section 20 is allowed to display a plurality of kinds of eyepoint images in, at least, a space-divisional manner (here, in a space-divisional and time-divisional manner) as described below. The display section 20 has a plurality of pixels Pix that are generally arranged in a matrix as shown in FIG. 3. Specifically, the pixels Pix are arranged in the display section 20 (specifically, within an effective display region 211 described below) along each of a horizontal line direction (here, X-axis direction) and a vertical line direction (here, Y-axis direction).

Figure 4A:
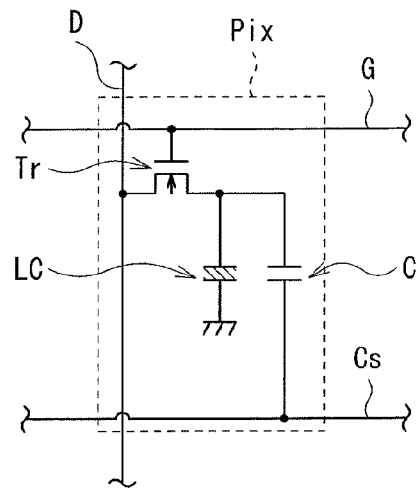
FIGS. 4A and 4B respectively are a circuit diagram and a sectional view illustrating an exemplary detailed configuration of a pixel shown in FIG. 3.

FIG. 4A illustrates an exemplary circuit configuration of each pixel Pix. Each pixel Pix has a liquid crystal element LC, a TFT (Thin Film Transistor) element Tr, and a capacitance element C. Each pixel Pix is connected to a gate line G for line-sequentially selecting a pixel to be driven, a data line D for supplying a pixel signal (a pixel signal supplied from a data driver 423 described below) to the pixel Pix to be driven, and a capacitance line Cs.

The liquid crystal element LC performs display operation in response to the pixel signal that is supplied to a first end of the liquid crystal element from the data line D through the TFT element Tr. The liquid crystal element LC includes, for example, liquid crystal of a vertical alignment (VA) or twisted nematic (TN) mode. The first end (on a side of pixel electrodes 202 described below) of the liquid crystal element LC is connected to a drain of the TFT element Tr and to one end of the capacitance element C, and a second end (on a side of a counter electrode 204 described below) is grounded. The capacitance element C stabilizes charge accumulated in the liquid crystal element LC. The one end of the capacitance element C is connected to the first end of the liquid crystal element LC and to the drain of the TFT element Tr, and the other end of the capacitance element C is connected to the capacitance line Cs. The TFT element Tr is a switching element that supplies a pixel signal based on the video signal S0 to the first end of the liquid crystal element LC and the one end of the capacitance element C, and is configured of a field effect transistor (FET). A gate of the TFT element Tr is connected to the gate line G, and a source thereof is connected to the data line D, and the drain thereof is connected to the first end of the liquid crystal element LC and the one end of the capacitance element C.

Figure 4B:
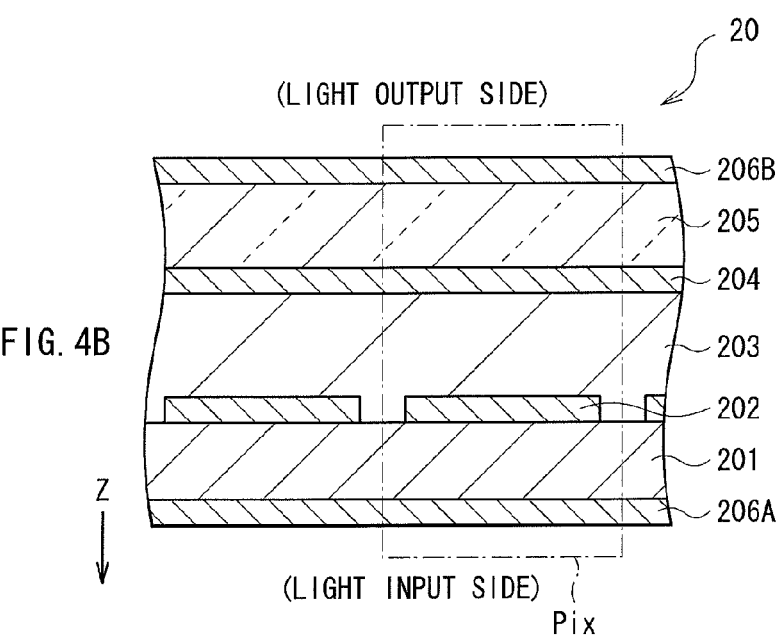

FIG. 4B illustrates an exemplary sectional configuration of the display section 20 including a pixel Pix. The display section 20 has a sectional structure where a liquid crystal layer 203 is enclosed between a drive substrate 201 and a counter substrate 205. The drive substrate 201, on which a pixel drive circuit including the TFT element Tr is provided, has a pixel electrode 202 provided for each of the pixels Pix.

The counter substrate 205, on which a not-shown color filter and a not-shown black matrix are provided, has the counter electrode 204 common to the pixels Pix on a surface on a liquid-crystal-layer 203 side. Polarizing plates 206A and 206B are attached to a light input side (here, a liquid-crystal-barrier 30 side) and a light output side (here, a viewing-surface side), respectively, in a crossed Nichol or parallel Nichol manner. The sectional configuration of the display section 20 is not limited to this, and other sectional configurations may be used. Specifically, for example, a so-called fringe-field-switching (FFS) or in-place-switching (IPS) type of liquid crystal, in which the drive substrate 201 includes a drive electrode and a common electrode thereon, at least one of which is an electrode having a pectinated shape, a slit, or the like, can be used regardless of a mode of the liquid crystal.

The display drive section 42 drives the display section 20 on the basis of the video signal S0 supplied from the control section 40 (display drive), and has a timing control section 421, a gate driver 422, and the data driver 423 as shown in FIG. 3.

The timing control section 421 controls drive timing of each of the gate driver 422 and the data driver 423, and supplies the video signal S0 supplied from the control section 40 to the data driver 423 as a video signal S1.

The gate driver 422 sequentially selects pixels Pix in the display section 20 for each horizontal line (row) in accordance with timing control by the timing control section 421 for line-sequential scan.

The data driver 423 supplies a pixel signal based on the video signal S1 to each of the pixels Pix in the display section 20. Specifically, the data driver 423 performs D/A (digital to analog) conversion on the basis of the video signal S1, and thus generates the pixel signal being an analog signal and supplies the pixel signal to each pixel Pix.

[Configurations of Liquid Crystal Barrier 30 and Barrier Drive Section 43]

The liquid crystal barrier 30 has a plurality of opening-and-closing sections (opening-and-closing sections 31 and 32 described below) each including a liquid crystal element described below, and transmits or blocks light emitted from the backlight 10.

The barrier drive section 43 drives the liquid crystal barrier 30 on the basis of the barrier control instruction supplied from the control section 40 (barrier drive).

[Detailed Configuration of Liquid Crystal Barrier 30]

Figure 5A:
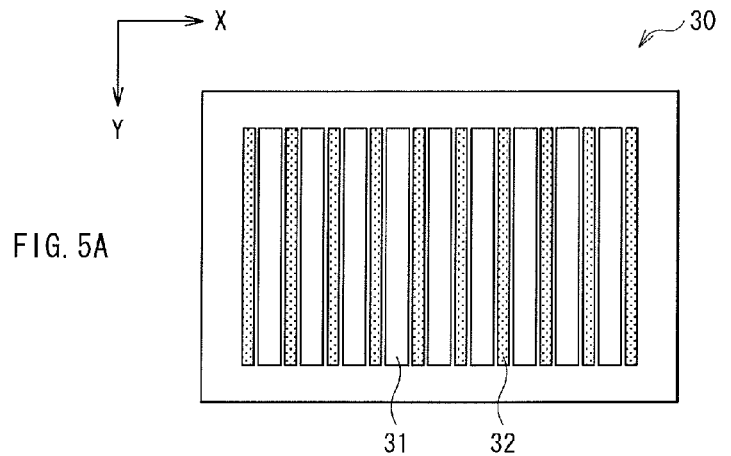
FIGS. 5A and 5B respectively are a plan view and a sectional view, illustrating an exemplary detailed configuration of a liquid crystal barrier shown in FIG. 1.
Figure 5B:
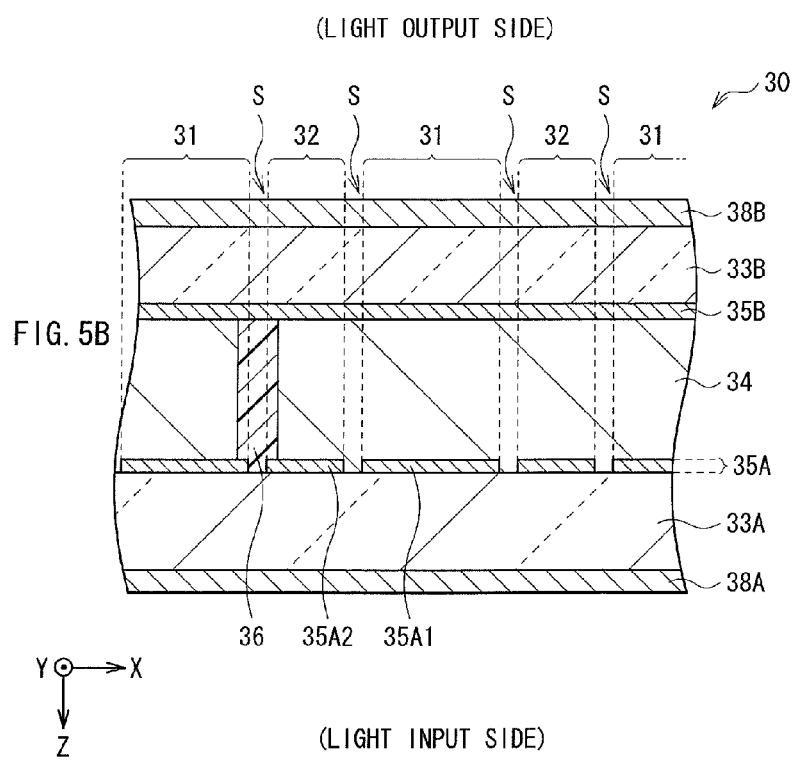

FIGS. 5A and 5B illustrate an exemplary detailed configuration of the liquid crystal barrier 30, where FIG. 5A illustrates a planar configuration (X-Y planar configuration), and FIG. 5B illustrates a sectional configuration (Y-Z sectional configuration). In this exemplary configuration, the liquid crystal barrier 30 performs normally white operation. That is, the liquid crystal barrier 30 transmits light while it is not driven (while no drive voltage is applied).

As shown in FIG. 5A, the liquid crystal barrier 30 has a plurality of opening-and-closing sections 31 and 32 each extending along a predetermined direction in a light barrier plane (here, an X-Y plane) to transmit or block light. Specifically, the opening-and-closing sections 31 and 32 each have a rectangular shape (with a major axis along a Y-axis direction) extending along the Y-axis direction (a vertical-line direction of the display section 20), and are arranged in parallel along an X-axis direction (a horizontal-line direction of the display section 20). In addition, boundary zones (slits, or gaps) S described below are provided between the respective opening-and-closing sections 31 and the respective opening-and-closing sections 32 (see, FIG. 5B). While the opening-and-closing sections 31 and 32 each extend along the vertical line direction of the display section 20 herein, this is not limitative. Specifically, the opening-and-closing sections 31 and 32 can extend in a substantially-vertical-line direction, or can be arranged in a matrix along the vertical and horizontal directions, or can be switched in each direction, for example.

Figure 6A:
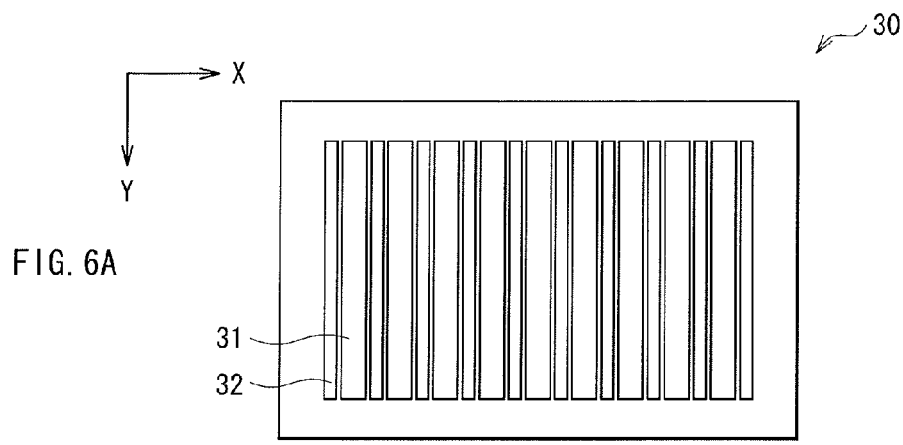
FIGS. 6A and 6B are plan views illustrating an exemplary operation state of the liquid crystal barrier shown in FIGS. 5A and 5B during normal display (two-dimensional display) and stereoscopic display, respectively.
Figure 6B:
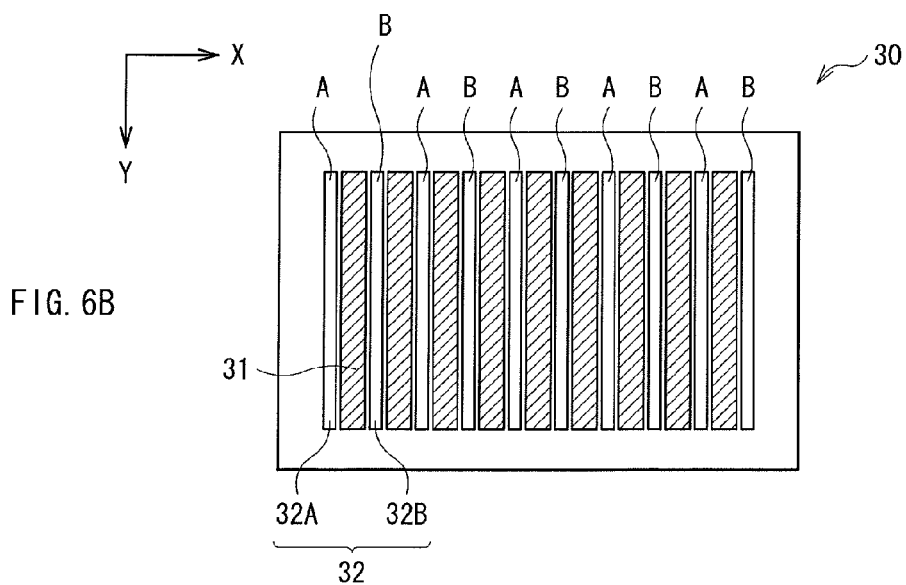

The opening-and-closing sections 31 and 32 differently operate depending on a display state of the stereoscopic display device 1: normal display (two-dimensional display) or stereoscopic display. Specifically, the opening-and-closing sections 31 are opened (transmit light) during the normal display, and closed (block light) during the stereoscopic display, as shown in FIGS. 6A and 6B. It is to be noted that, in FIGS. 6A and 6B, closed regions (regions of the opening-and-closing sections 31) are shaded. On the other hand, as shown in FIGS. 6A and 6B, the opening-and-closing sections 32 are opened during the normal display, and time-divisionally opened and closed during the stereoscopic display. It is to be noted that FIG. 6B schematically illustrates an exemplary operation state of the liquid crystal barrier 30 during the stereoscopic display.

The opening-and-closing sections 32 have two groups (groups A and B) that are opened or closed at the same timing. Specifically, the opening-and-closing sections 32 include opening-and-closing sections 32A belonging to the group A, which are opened or closed at first timing, and opening-and-closing sections 32B belonging to the group B, which are opened or closed at second timing. The barrier drive section 43 drives the liquid crystal barrier 30 such that the plurality of opening-and-closing sections 32A belonging to the same group are opened or closed at the same timing, and the plurality of opening-and-closing sections 32B belonging to the same group are opened or closed at the same timing during the stereoscopic display. Specifically, the barrier drive section 43 drives the liquid crystal barrier 30 such that the plurality of opening-and-closing sections 32A belonging to the group A and the plurality of opening-and-closing sections 32B belonging to the group B are time-divisionally alternately opened or closed.

The liquid crystal barrier 30 (each of the opening-and-closing sections 31 and 32) is configured of a liquid crystal element as shown in FIG. 5B. Specifically, the liquid crystal barrier 30 has a liquid crystal layer 34 (enclosed) between a transparent substrate 33A and a transparent substrate 33B each including, for example, glass. In the transparent substrates 33A and 33B (a pair of substrates), the transparent substrate 33A is disposed on a light input side (here, backlight 10 side), and the transparent substrate 33B is disposed on a light output side (here, display 20 side). Transparent electrode layers 35A and 35B including, for example, indium tin oxide (ITO) are provided on a surface on a liquid crystal layer 34 side of the transparent substrate 33A and on a surface on a liquid crystal layer 34 side of the transparent substrate 33B, respectively. Polarizing plates 38A and 38B are attached to a light input side of the transparent substrate 33A and a light output side of the transparent substrate 33B, respectively. The liquid crystal barrier 30 may have a component (for example, a planarization film) other than these components. One of the pair of polarizing plates of the display section 20 (liquid crystal panel) may be common to (combined with) one of the pair of polarizing plates of the liquid crystal barrier 30. Hereinafter, a configuration of each section is described in detail.

The liquid crystal layer 34 includes, for example, TN-mode liquid crystal (TN liquid crystal). Here, a case where the liquid crystal layer 34 is driven in a normally white mode (performs normally white operation) is exemplified.

One or both of the transparent electrode layers 35A and 35B are divided into a plurality of sub-electrodes to which a voltage is allowed to be individually supplied. For example, the transparent electrode layer 35A is divided into a plurality of sub-electrodes 35A1 and 35A2, and the transparent electrode layer 35B is provided as an electrode common to the sub-electrodes 35A1 and 35A2 herein. Regions (sub-regions) corresponding to the respective sub-electrodes 35A1 and 35A2 correspond to the opening-and-closing sections 31 and 32. In addition, the sub-electrodes 35A1 and 35A2 are arranged separately from each other so as to be electrically isolated. Boundary regions (boundary zones S) having no sub-electrodes 35A1 or 35A2 (the transparent electrode layer 35A) exist between the adjacent opening-and-closing sections 31 and 32. Specifically, the boundary zones S correspond to the grooves (slits) between the sub-electrodes 35A1 and 35A2. Width of each opening-and-closing section 31 (width of each sub-electrode 35A1) is, for example, approximately 50 μm to 500 μm both inclusive. Width of each opening-and-closing section 32 (width of each sub-electrode 35A2) is, for example, approximately 50 μm to 500 μm both inclusive. Width of each boundary zone S is, for example, approximately 3 μm to 20 μm both inclusive. According to such a configuration, voltages are applied only to selective regions of the liquid crystal layer 34, leading to switching between light-transmitting (white display) and light-blocking (black display) for each of the opening-and-closing sections 31 and 32. It is to be noted that a not-shown alignment film is provided on a surface on a liquid-crystal-layer 34 side of each of the transparent electrode layers 35A and 35B.

The polarizing plates 38A and 38B control a polarization direction of light input to or output from the liquid crystal layer 34. Absorption axes of the polarizing plates 38A and 38B are disposed orthogonally to each other in the case where TN liquid crystal is used for the liquid crystal layer 34, for example.

Moreover, in such a liquid crystal barrier 30, a plurality of spacers 36 are provided (stood or fixed) between the transparent substrates 33A and 33B for controlling thickness of the liquid crystal layer 34 (an interval (a cell gap) between the transparent substrates 33A and 33B). The spacers 36 include, for example, resin such as a photoresist (for example, photocuring resin), and are each molded into a columnar shape such as a cylindrical shape. The diameter (diameter of a circular shape in the X-Y plane) is, for example, approximately 5 μm to 30 μm both inclusive. It is noted that the spacers 36 may be provided on either of the transparent substrates 33A and 33B. The reason why such columnar spacers 36 are provided in the liquid crystal barrier 30 is as follows.

Specifically, a reduction in thickness of a display module is recently demanded as a result of a reduction in thickness of a device (an electronic device) having the display module therein. A thinner display module is more significantly affected by a load during operation or by stress in a manufacturing process, and thus optimization of a panel structure is also necessary for the stereoscopic display device including the display section (liquid crystal display panel) and a light barrier element (liquid crystal barrier). Here, the liquid crystal barrier typically has a simple pixel structure compared with the liquid crystal display panel (has no wiring line, structure for color display, or the like). Accordingly, the liquid crystal barrier has a high transmittance compared with the liquid crystal display panel, allowing a viewer to clearly view unevenness in cell gaps (unevenness in gaps) due to point pressing, face pressing, stress-induced strain, or the like. Specifically, in the case where stress resistance (strength) of the two panels (the liquid crystal display panel and the liquid crystal barrier) is not high enough, the cell gaps locally vary due to an external load or stress in a stacking step of the two panels, causing unevenness in display (yellowing) due to partial discoloration.

Thus, spacers (spraying spacers) are typically used in the liquid crystal barrier of the stereoscopic display device for controlling the cell gaps. However, the liquid crystal barrier including the spraying spacers has the following two difficulties. First, the spraying spacers are hardly arranged in a high density and thus may not have enough resistance against face pressing or point pressing to achieve a reduction in thickness of the device. Secondly, if the liquid crystal barrier receives stress in the above-described stacking step or the like, the local variation in cell gaps described above occurs due to deformation of the spraying spacers, leading to partial unevenness in display. Thus, the liquid crystal barrier 30 of the embodiment includes so-called columnar spacers (spacers 36), of which the density, the positions, and the dimensions may be appropriately controlled, to overcome the above two difficulties.

Such spacers 36 are provided in a plurality of selective regions in the X-Y plane in the liquid crystal barrier 30, namely, near (across) the respective boundary zones S herein. This, however, is not limitative, and the spacers 36 may be provided on the opening-and-closing sections 31 and 32 (on the sub-electrodes 35A1 and 35A2). A detailed configuration (an exemplary arrangement configuration) of such spacers 36 is described below (FIGS. 7A to 10).

Opening-and-closing operation of the opening-and-closing sections 31 and 32 of the liquid crystal barrier 30 is similar to the display operation of the display section 20. Specifically, light emitted from the backlight 10 is formed into linearly polarized light in a direction determined by the polarizing plate 38A and input to the liquid crystal layer 34. In the liquid crystal layer 34, a direction of the liquid crystal molecules (not shown) is changed in a certain response time depending on a difference in electric potential supplied to the transparent electrode layers 35A and 35B. A polarization state of the light input to such a liquid crystal layer 34 is changed depending on the alignment state of the relevant liquid crystal molecules. The light transmitted by the liquid crystal layer 34 is input to the polarizing plate 38B, and only light in a particular polarization direction passes through the polarizing plate 38B. In this way, intensity of light is modulated in the liquid crystal layer 34 (the liquid crystal element).

According to such a configuration, for normally white operation, if a difference in electric potential between the transparent electrode layers 35A and 35B increases upon application of a voltage to each of the electrodes 35A and 35B, light transmittance of the liquid crystal layer 34 decreases, and thus the opening-and-closing sections 31 and 32 block light (are closed). On the other hand, if the difference in electric potential between the transparent electrode layers 35A and 35B decreases, the light transmittance of the liquid crystal layer 34 increases, and thus the opening-and-closing sections 31 and 32 transmit light (are opened).

While it has been described that the liquid crystal barrier 30 performs normally white operation herein, this is not limitative. For example, the liquid crystal barrier 30 may perform normally black operation instead. In such a case, if the potential difference between the transparent electrodes 35A and 35B increases, the opening-and-closing sections 31 and 32 transmit light, and if the potential difference between the transparent electrodes 35A and 35B decreases, the opening-and-closing sections 31 and 32 block light. Selection between the normally white operation and the normally black operation may be set depending on directions of absorption axes of the polarizing plates 38A and 38B and alignment of the liquid crystal in the liquid crystal layer 34, for example.

[Exemplary Arrangement Configuration of Spacers 36]

An exemplary arrangement configuration of the spacers 36 in the liquid crystal barrier 30 of the embodiment is described in detail with reference to FIGS. 7A to 10.

In the embodiment, the plurality of spacers 36 are randomly (non-periodically, or irregularly) arranged in part or all of a region in substrate surfaces of the transparent substrate 33A and 33B (a light barrier surface, or a light barrier region corresponding to a region having the opening-and-closing sections 31 and 32). Such random arrangement of the spacers 36 is determined through random number calculation, for example. This suppresses unevenness in luminance in a display image due to a moire phenomenon (occurrence of an interference fringe) caused by interference between an arrangement configuration of the pixels Pix in the display section 20 and an arrangement configuration of the spacers 36 in the liquid crystal barrier 30, as described in detail below.

Figure 7A:
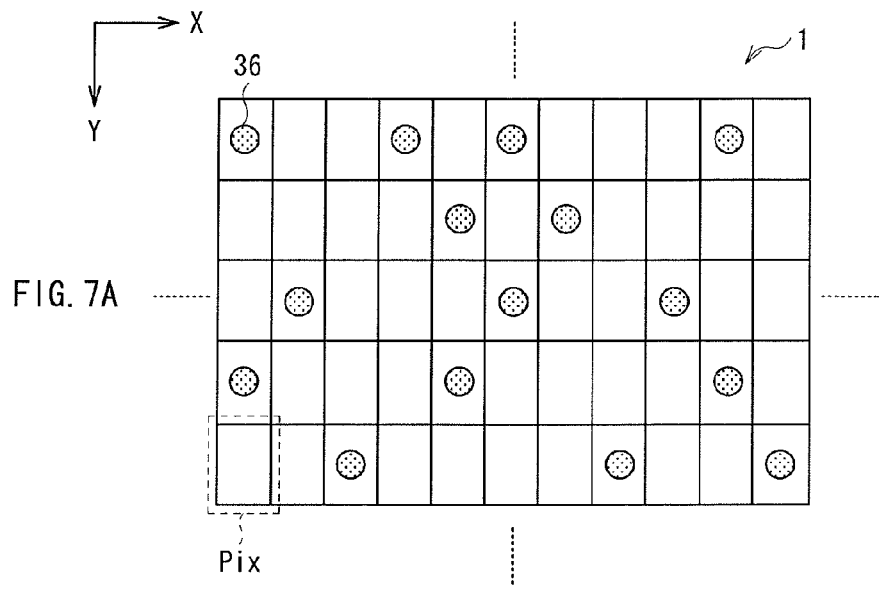
FIGS. 7A and 7B are schematic plan views illustrating exemplary arrangements of spacers in the liquid crystal barrier in association with a pixel arrangement in the display section.

Specifically, in the embodiment, the spacers 36 are arranged as schematically shown in FIG. 7A, for example. That is, a plurality of the spacers 36 are non-periodically arranged with respect to a plurality of the pixels Pix arranged in the display section 20 in part or all of the region in the substrate surfaces (light barrier region: the X-Y plane herein). Specifically, the arrangement configuration of the pixels Pix and the arrangement configuration of the spacers 36 are in a non-periodical (irregular) relationship. In other words, when one spacer 36 is noticed, two or more kinds of distances exist (in the light barrier surface) between the spacer 36 and other spacers 36. In the exemplary configuration shown in FIG. 7A, positions of the respective spacers 36 (positions in the pixels Pixs where the respective spacers 36 exist) are substantially even (substantially equal) in the pixels Pix, and desirably even (equal).

Figure 7B:
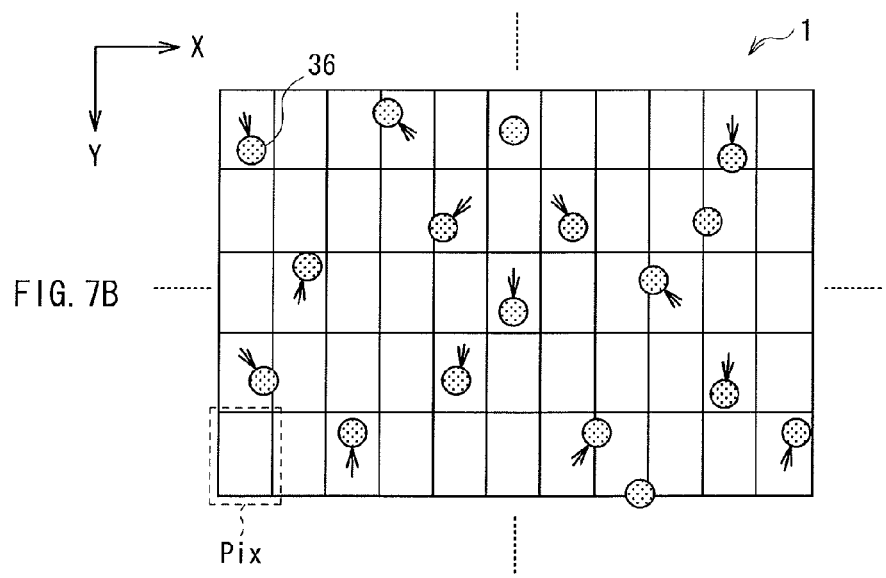

In an exemplary configuration shown in FIG. 7B, the arrangement of the plurality of spacers 36 is non-periodical with respect to arrangement of the plurality of pixels Pix in part or all of the region described above, as in the exemplary configuration shown in FIG. 7A. In the exemplary configuration of FIG. 7B, the positions of the respective spacers 36 are irregular (different from one another) in the pixels Pix unlike the exemplary configuration of FIG. 7A. That is, the arrangement configuration of the spacers 36 is in a non-periodical relationship with the arrangement configuration of the pixels Pix, and the positions of the respective spacers 36 are non-periodical in the pixels Pix. Specifically, the positions of the spacers 36 arranged as shown in FIG. 7B are displaced in directions shown in arrows in FIG. 7B with reference to the positions of the spacers 36 arranged as shown in FIG. 7A. In such a configuration, the unevenness in luminance in a display image due to the moire phenomenon is more effectively suppressed, as described in detail below.

Some pixels may not correspond to the arranged positions of the spacer 36 (may have no spacer 36 thereon) as shown in FIGS. 7A and 7B. Alternatively, a plurality of the spacers 36 may be disposed in one pixel Pix, or one spacer 36 may be disposed across a plurality of the pixels Pix. Furthermore, dimensions (size) or shapes of the respective spacers 36 may not be the same (the dimensions or shapes may be different between the spacers 36). In other words, the dimensions or the shapes of the spacers 36 may be randomly set.

In the embodiment, in the case where the plurality of pixels Pix in the display section 20 include pixels corresponding to a plurality of colors as described below (a multicolor pixel structure), the spacers 36 are further desirably arranged to satisfy the following. Specifically, it is desirable that a total value (an integrated value) of area of overlapped regions between the pixels Pix and the spacers 36 be substantially equal (be equal) between the plurality of colors in part or all of the display region (effective display region 211) of the display section 20. In other words, the total value of area of the overlapped regions is set to be not biased (be even) between the plurality of colors. It is preferable that "part or all of the display region" partially or entirely (desirably entirely) correspond to "part or all of the light barrier region" described above. However, the two kinds of "part or all of the region in the light barrier resion" may be different from each other. Here, an allowed value of the bias level of the total value of area (a threshold of a range of a substantially even value) is defined depending on the optical specifications of the liquid crystal barrier 30, the resolution of the opening-and-closing sections 31 or 32, or the like.

Figure 8:
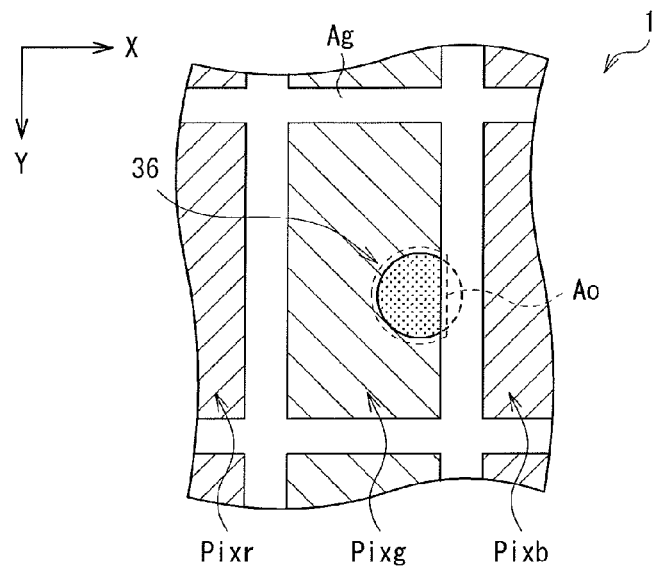
FIG. 8 is a schematic plan view for explaining overlapped regions between the spacers in the liquid crystal barrier and pixel regions in the display section.
Figure 9:
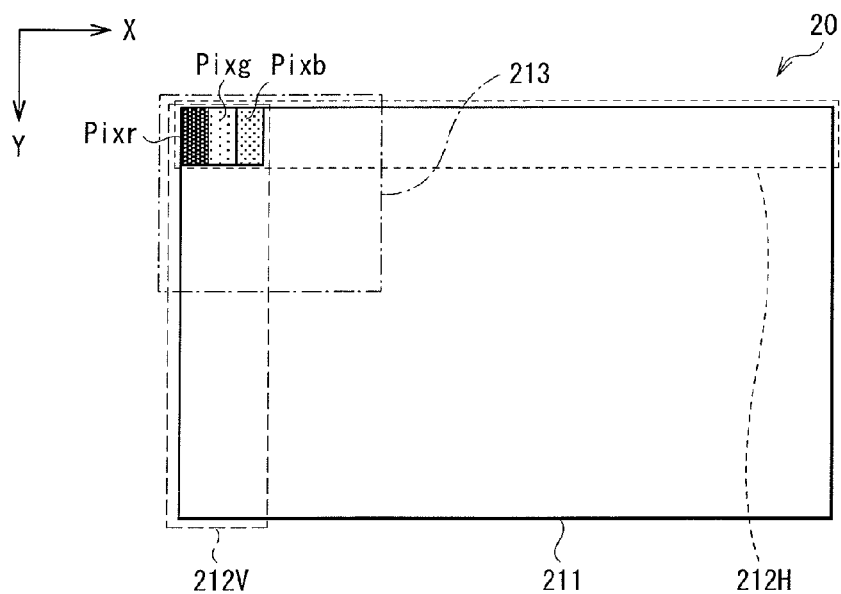
FIG. 9 is a schematic plan view for explaining an effective display region, a horizontal-line region, a vertical-line region, and a partitioned region.

In such a case, in the case where the pixels corresponding to the plurality of colors include three-color pixels of red (R) pixels Pixr, green (G) pixels Pixg, and blue (B) pixels Pixb as shown in FIGS. 8 and 9, the following is given as a specific example. Specifically, for example, a total value of area of overlapped regions Ao as shown in FIG. 8 is substantially equal between the red (R) pixels Pixr, the green (G) pixels Pixg, and the blue (B) pixels Pixb in part or all of the effective display region 211 of the display section 20. The overlapped regions Ao correspond to regions obtained by subtracting regions between the pixels Pix (inter-pixel regions Ag) corresponding to a region where wirings and the like are provided (black matrix region) from the overall arrangement region (sectional area) of the spacers 36. Here, "part or all of the effective display region 211" includes, for example, regions shown in FIG. 9. Specifically, the regions include the entire effective display region 211, a horizontal-line region 212H, a vertical-line region 212V, and a predetermined partial region (partitioned region 213) obtained by severally partitioning the effective display region 211. It is noted that size (size in each of horizontal and vertical directions) of each partitioned region 213 is defined depending on a pitch of the pixels Pix in the display section 20 or arrangement density of the spacers 36, for example. Setting is made such that such an arrangement condition of the spacers 36 is satisfied, which reduces the unevenness in luminance in a display image due to the moire phenomenon as described above and reduces unevenness in color in a display image due to a color moire phenomenon, as described in detail below.

Figure 10:
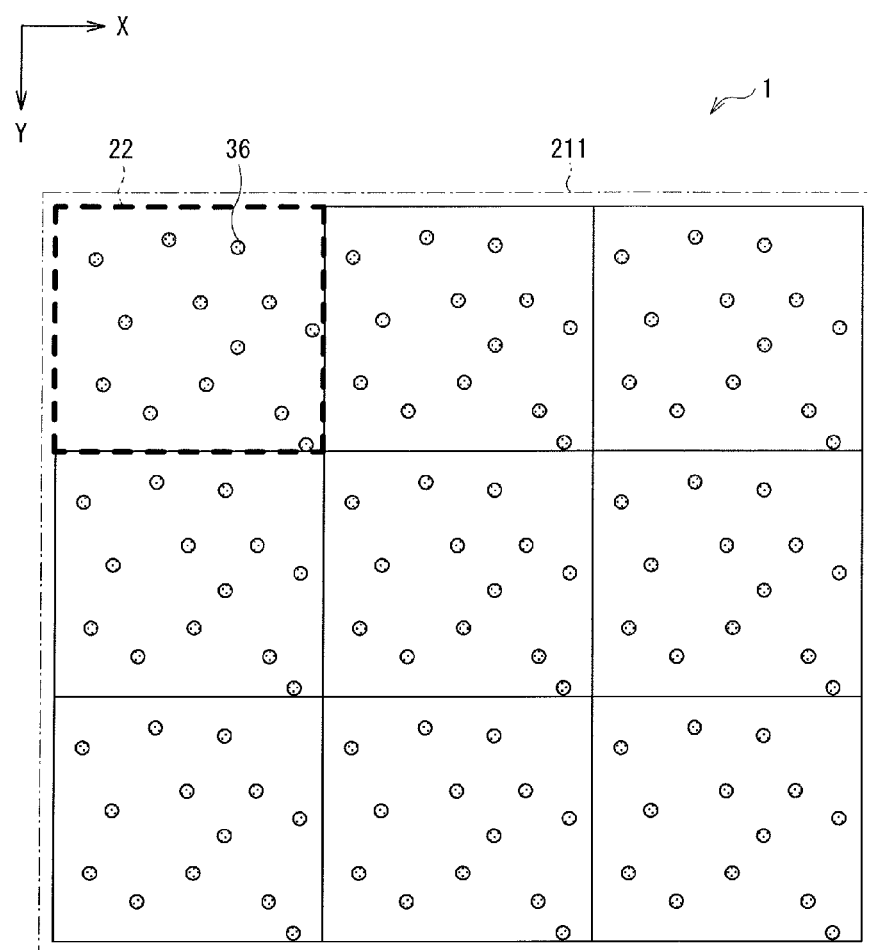
FIG. 10 is a schematic plan view for explaining a unit region of an arrangement configuration of the spacers in the liquid crystal barrier.

While the above-described random arrangement configuration of the spacers 36 is desirably set over the entire light barrier region (or the entire effective display region 211), the configuration may be individually set within each of a plurality of unit regions 22, for example, as shown in FIG. 10 rather than the entire light barrier region. Specifically, in the example shown in FIG. 10, the effective display region 211 (the light barrier region) is partitioned into the plurality of unit regions 22, and the plurality of spacers 36 are randomly arranged in each unit region 22 as described above. In such a configuration, a mask pattern is simply structured during production compared with a case where the random arrangement of the spacers 36 is set over the entire light barrier region, and thus the random arrangement of the spacers 36 is more simply achieved. It is noted that size (size in each of horizontal and vertical directions) of the unit region 22 is defined depending on the pitch of the pixels Pix in the display section 20, arrangement density of the spacers 36, an interval between the display section 20 and the liquid crystal barrier 30 (an appropriate viewing distance for stereoscopic display), or panel size, for example.

The arrangement density of the spacers 36 (density defined by arrangement area) is desirably substantially equal (substantially even) between the unit regions 22, and is more desirably equal (even). If the arrangement density of the spacers 36 is uneven (is biased) between the unit regions 22, light transmittance is reduced in the neighborhood of the relevant unit region 22 compared with the periphery thereof, leading to unevenness in luminance that is viewed in a display image. It is noted that the arrangement density of the spacers 36 in each unit region 22 desirably has a value in a securable range of the above-described resistance against face pressing and point pressing.

[Effects and Advantages of Stereoscopic Display Device 1]
(1. Display Operation)

In the stereoscopic display device 1, the control section 40 generates and supplies the control instruction to each of the backlight drive section 41, the display drive section 42, and the barrier drive section 43 in response to the video signal Sin supplied from an external unit, and controls the sections to operate in synchronization with one another. Specifically, the backlight drive section 41 drives the backlight 10 on the basis of the backlight control instruction supplied from the control section 40 (emission drive). The backlight 10 outputs surface-emitted light to the display section 20. The barrier drive section 43 drives the liquid crystal barrier 30 on the basis of the barrier control instruction supplied from the control section 40 (barrier drive). The liquid crystal barrier 30 transmits or blocks light emitted from the backlight 10 as described above in each of the opening-and-closing sections 31 or 32. The display drive section 42 drives the display section 20 on the basis of the video signal S0 supplied from the control section 40 (display drive). The display section 20 modulates light, which is emitted from the backlight 10 and transmitted by the liquid crystal barrier 30 as described above, on the basis of the display control signal supplied from the display drive section 42 for video display based on the video signal S0.

The stereoscopic display and the normal display (two-dimensional display) performed by the stereoscopic display device 1 are described in detail with reference to FIGS. 11A to 12B. FIGS. 11A to 11C schematically illustrates sectional structures showing states of the liquid crystal barrier 30 in the stereoscopic display and the normal display (two-dimensional display). FIG. 11A shows a first state of the stereoscopic display (stereoscopic display 1), FIG. 11B shows a second state of the stereoscopic display (stereoscopic display 2), and FIG. 11C shows a state of the normal display (two-dimensional display). In this example, the opening-and-closing sections 32A and 32B each are provided by one for six pixels Pix in the display section 20. In FIGS. 11 and 12, the liquid crystal barrier 30 is shaded in the light-blocking portions.

For the normal display, in the liquid crystal barrier 30, both the opening-and-closing sections 31 and the opening-and-closing sections 32 (opening-and-closing sections 32A and 32B) are continuously opened (transmit light) as shown in FIG. 11C. Accordingly, a viewer may directly view normal two-dimensional images that are shown on the display section 20 on the basis of the video signal S0.

On the other hand, for the stereoscopic display, in the liquid crystal barrier 30, the opening-and-closing sections 32 (opening-and-closing sections 32A and 32B) are time-divisionally opened and closed, and the opening-and-closing sections 31 are continuously closed (block light) as shown in FIGS. 11A and 11B. Here, the display section 20 displays a plurality of kinds of eyepoint images in a space-divisional and time-divisional manner.

Specifically, for the stereoscopic display 1 as shown in FIG. 11A, the opening-and-closing sections 32A are opened, and the opening-and-closing sections 32B are closed. In the display section 20, six pixels Pix, which are adjacently disposed at positions corresponding to each of the opening-and-closing sections 32A, perform display of data corresponding to six eyepoint images contained in the video signal S0. In detail, the pixels Pix in the display section 20 perform display of pixel data P1 to P6 corresponding to the respective six eyepoint images contained in the video signal S0, for example, as shown in FIG. 12A. Here, light emitted from the backlight 10 first enters the liquid crystal barrier 30. The light is then partially transmitted by the opening-and-closing sections 32A and modulated by the display section 20, and the six eyepoint images are output. Consequently, for example, a viewer views the pixel information P4 by his left eye and the pixel information P3 by his right eye, leading to viewing of a stereoscopic image.

Similarly, for the stereoscopic display 2 as shown in FIG. 11B, the opening-and-closing sections 32B are opened, and the opening-and-closing sections 32A are closed. In the display section 20, six pixels Pix, which are adjacently disposed at positions corresponding to the opening-and-closing sections 32B, perform display of data corresponding to six eyepoint images contained in the video signal S0. In detail, the pixels Pix in the display section 20 perform display of pixel data P1 to P6 corresponding to the respective six eyepoint images contained in the video signal S0, for example, as shown in FIG. 12B. Here, light emitted from the backlight 10 first enters the liquid crystal barrier 30. The light is then partially transmitted by the opening-and-closing sections 32B and modulated by the display section 20, and the six eyepoint images are output. Consequently, for example, a viewer views the pixel information P4 by his left eye and the pixel information P3 by his right eye, leading to viewing of a stereoscopic image.

In this way, a viewer views different pixel data among the pixel data P1 to P6 by his two eyes, so that the viewer is allowed to perceive a stereoscopic image. In addition, the opening-and-closing sections 32A and 32B are time-divisionally alternately opened for image display, so that a viewer views images displayed at positions offset from each other in an averaged manner. Accordingly, the stereoscopic display device 1 achieves resolution twice as high as resolution in the case where only the opening-and-closing sections 32A are provided. In other words, decrease in resolution of the stereoscopic display device 1 is kept at $\frac{1}{3}(=(\frac{1}{6})*2)$ of resolution in two-dimensional display.

(2. Effects of Liquid Crystal Barrier 30)

Next, effects of the liquid crystal barrier 30 are described in detail in comparison with a comparative example.

(2-1. Comparative Example)

Figure 13:
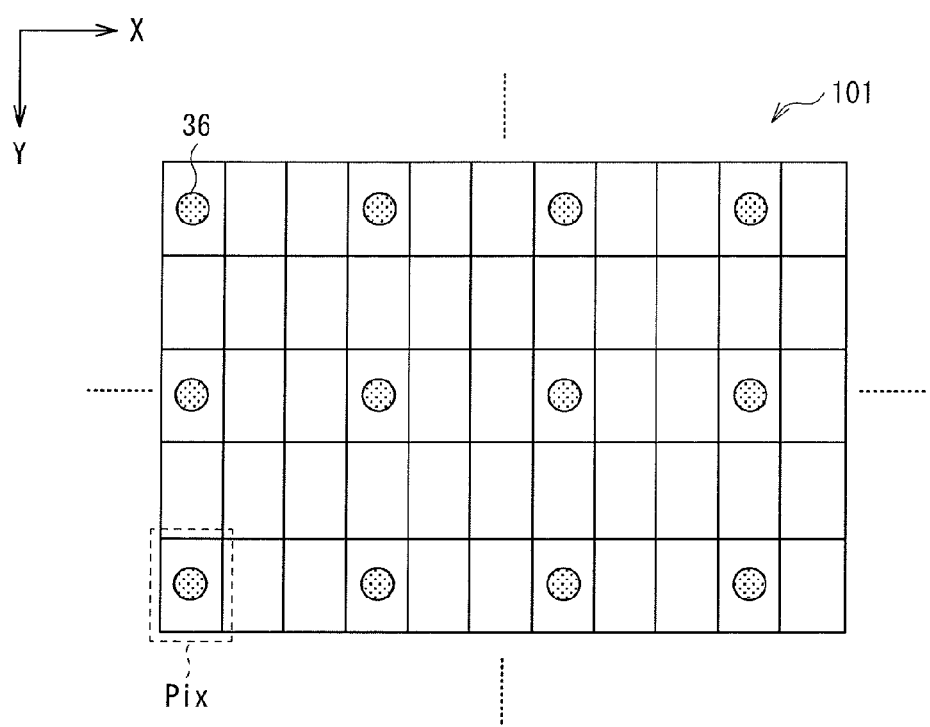
FIG. 13 is a schematic plan view illustrating an exemplary arrangement of spacers in a liquid crystal barrier in association with a pixel arrangement in a display section according to a comparative example.

In a stereoscopic display device (stereoscopic display device 101) according to a comparative example shown in FIG. 13, the spacers 36 are arranged in a liquid crystal barrier (liquid crystal barrier 103) in the following way. Specifically, the plurality of spacers 36 are periodically (regularly, or non-randomly) arranged over the entire surfaces of the transparent substrate 33A and 33B (the entire light barrier surface or light barrier region) unlike the arrangement configuration in the liquid crystal barrier 30 of the embodiment described above. That is, in the liquid crystal barrier 103 in the comparative example, the plurality of spacers 36 are periodically arranged with respect to the plurality of pixels Pix arranged in the display section 20. In other words, an arrangement configuration of the pixels Pix and an arrangement configuration of the spacers 36 are in a periodical (regular) relationship. Such a periodical arrangement of the spacers 36 is set in consideration of optical design (color balance) of the liquid crystal barrier 103 or simplicity of mask design.

However, unevenness in luminance (a dot pattern) caused by the interference fringe (the moire phenomenon) occurs in a display screen of the stereoscopic display device 101 of the comparative example due to such a periodical arrangement of the spacers 36 (for example, see FIG. 15A described below). In detail, such unevenness in luminance caused by the moire phenomenon occurs not only in the stereoscopic display but also in the normal display (two-dimensional display). As a result, image quality is reduced in each of the two-dimensional display and the three-dimensional display performed by the stereoscopic display device 101. Such unevenness in luminance caused by the moire phenomenon is estimated to occur according to the following principle.

Figure 14A:
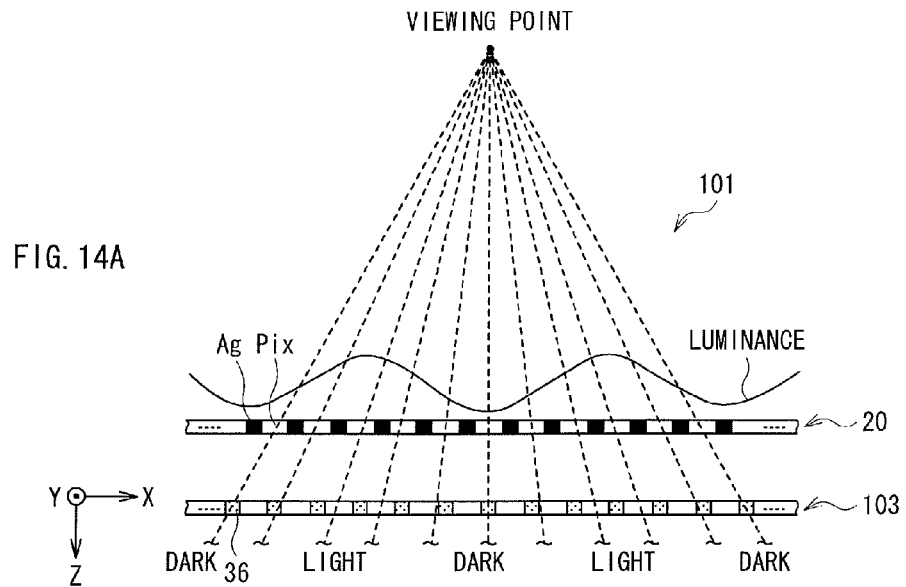
FIGS. 14A and 14B are schematic views for explaining a principle of occurrence of unevenness in luminance (a moire phenomenon) and unevenness in color (a color moire phenomenon) in a stereoscopic display device according to the comparative example, respectively.

Specifically, the liquid crystal molecules in the liquid crystal layer 34 do not exist in particular regions having the spacers 36 in the light barrier region of the liquid crystal barrier 103, and thus the particular regions do not transmit light even in the normal display (non-light-transmitting regions), leading to low luminance compared with the peripheries of the particular regions. Hence, in the stereoscopic display device 101 of the comparative example, in which the arrangement configuration of the pixels Pix and the arrangement configuration of the spacers 36 are in the periodical relationship, high and low luminance regions periodically appear in a display region as viewed from a certain viewing point due to interference of light between the arrangement configurations, as schematically shown in FIG. 14A. According to such a principle, in the comparative example, unevenness in luminance in a display image is conceivably caused by the moire phenomenon (occurrence of the interference fringe) due to the interference of light between the arrangement configuration of the pixels Pix in the display section 20 and the arrangement configuration of the spacers 36 in the liquid crystal barrier 30.

Figure 14B:
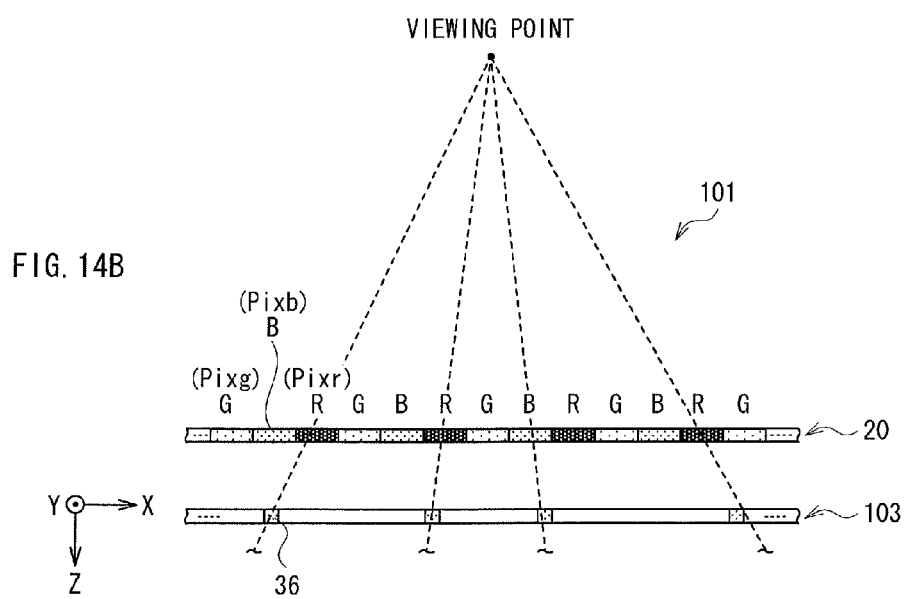

In addition, in the case where the plurality of pixels Pix in the display section 20 include pixels corresponding to a plurality of colors (here, a three-color pixel structure including red pixels Pixr, green pixels Pixg, and blue pixels Pixb), the following difficulty occurs, for example, as schematically shown in FIG. 14B. Specifically, the unevenness in color caused by the color moire phenomenon occurs in each of the stereoscopic display and the normal display, resulting in a local (partial) variation in color balance (white balance). This also reduces the image quality. This conceivably occurs when the pixels Pix overlapping with the spacers 36 are biased to particular color pixels in a case where the display image is viewed from a certain viewing point, for example, as schematically shown in FIG. 14B. For example, the red pixels Pixr overlap with the spacers 36 at a higher rate than the green pixels Pixg and the blue pixels Pixb (the pixels Pix overlapping with the spacers 36 are biased to red pixels) in this example, and thus white balance is locally shifted toward a cyan color (to lighter red).

In this way, the unevenness in luminance due to the moire phenomenon, the unevenness in color due to the color moire phenomenon, or the like occurs in the stereoscopic display device 101 of the comparative example, resulting in a reduction in image quality in each of the two-dimensional display and the three-dimensional display.

(2-2. The Embodiment)

In the stereoscopic display device 1 according to the embodiment, the plurality of spacers 36 are randomly arranged in the liquid crystal barrier 30 as described above. This reduces the unevenness in luminance due to the moire phenomenon or the unevenness in color due to the color moire phenomenon compared with in the comparative example, or avoids such unevenness. Hereinafter, a reduction effect of the unevenness in luminance or the unevenness in color of the liquid crystal barrier 30 of the embodiment is described in detail.

(Reduction Effect of Unevenness in Luminance (Moire Phenomenon))

In the liquid crystal barrier 30, the plurality of spacers 36 are randomly arranged in part or all of the region in the light barrier surface (light barrier region) described above, for example, as shown in FIGS. 7A and 7B. Specifically, in the example shown in FIG. 7A, the plurality of spacers 36 are non-periodically arranged with respect to the plurality of pixels Pix arranged in the display section 20 in part or all of the light barrier region. That is, the arrangement configuration of the pixels Pix and the arrangement configuration of the spacers 36 are in a non-periodical relationship. This suppresses the unevenness in luminance due to the moire phenomenon (occurrence of the interference fringe) compared with the comparative example where the plurality of spacers 36 are non-randomly (periodically, or regularly) arranged, or avoids such unevenness.

In the embodiment, in the case where the arrangement of the spacers 36 in the liquid crystal barrier 30 is set as in the example shown in FIG. 7B, the unevenness in luminance due to the moire phenomenon in a display image is more effectively suppressed. Specifically, in this example, the spacers 36 are irregularly positioned with respect to the pixels Pix. That is, the arrangement configuration of the spacers 36 is in a non-periodical relationship with the arrangement configuration of the pixels Pix, and the respective spacers 36 are non-periodically positioned in the pixels Pix. This is particularly effective for the spacers 36 arranged in a relatively high density or for the spacers 36 having an extremely low light transmittance.

(Reduction Effect of Unevenness in Color (Color Moire Phenomenon))

Furthermore, in the embodiment, in the case where the plurality of pixels Pix in the display section 20 include pixels corresponding to a plurality of colors, and the spacers 36 in the liquid crystal barrier 30 are set as in the example shown in FIGS. 8 and 9, an effect of reducing the unevenness in color is provided. Specifically, in this example, the total value of the area of the overlapped regions Ao between the pixels Pix and the spacers 36 is substantially equal (is equal) between the plurality of colors (here, three colors of red, green, and blue) in part or all of the effective display region 211 of the display section 20. In other words, the total value of the area of the overlapped regions Ao is set to be not biased (be even) between the plurality of colors. Setting is made such that such an arrangement condition of the spacers 36 is also satisfied, which reduces the unevenness in luminance in a display image due to the moire phenomenon as described above and reduces the unevenness in color in a display image due to the color moire phenomenon.

(Simulation Result of Display Images in Examples and Comparative Example)

FIGS. 15A to 15C schematically illustrate exemplary arrangement configurations of the spacers 36 in the liquid crystal barriers 30 and 103 and exemplary display images to be viewed in the stereoscopic display devices 1 and 101 according to Examples (Examples 1 and 2) of the embodiment and the comparative example. The exemplary display images shown in FIGS. 15A to 15C are obtained through a simulation result while a point near the center of each of the stereoscopic display devices 1 and 101 is set as a viewing point, while a level (rate of a variation in luminance) of the unevenness in luminance or of the unevenness in color is enlarged to approximately 1.5 times. The chromaticity varies with a variation in luminance because it is expressed as a function of luminance. Here, size of the pixel Pix is 30 μm in an X direction and 90 μm in a Y direction, a panel interval between the display section 20 and the liquid crystal barriers 30 is 670 μm, and arrangement densities (area densities) of the spacers 36 in the comparative example and the Examples 1 and 2 are 0.70%, 1.07%, and 1.00%, respectively.

In the comparative example shown in FIG. 15A, since the plurality of spacers 36 are periodically arranged over the entire light barrier region as described above, both of the unevenness in luminance due to the moire phenomenon and the unevenness in color due to the color moire phenomenon occur in a display screen.

In the Example 1 shown in FIG. 15B, the plurality of spacers 36 are somewhat randomly arranged (randomly arranged in each unit region 22 of the light barrier region). In addition, the total value of the area of the overlapped regions Ao is substantially equal (is equal) between the three colors of red, green, and blue (between the pixels Pixr, Pixg, and Pixb) in each partitioned region 213 (here, a region including three pixels in the X direction and three pixels in the Y direction) of the effective display region 211. This somewhat reduces the unevenness in luminance compared with the comparative example shown in FIG. 15A, and avoids occurrence of the unevenness in color.

In the Example 2 shown in FIG. 15C, the plurality of spacers 36 are completely randomly arranged (randomly arranged over the entire light barrier region). In addition, the total value of the area of the overlapped regions Ao is substantially equal (is equal) between the three colors of red, green, and blue over the entire effective display region 211. This effectively reduces the unevenness in luminance compared with the Example 1 shown in FIG. 15B (avoids occurrence of the unevenness in luminance here), and avoids occurrence of the unevenness in color as in the Example 1.

As described above, in the embodiment, since the plurality of spacers 36 are randomly arranged in part or all of the region in the light barrier surface of the liquid crystal barrier 30, the unevenness in luminance due to the moire phenomenon is suppressed, leading to an improvement in display image quality.

In addition, in the case where a plurality of pixels Pix in the display section 20 include pixels corresponding to a plurality of colors, and the total value of the area of the overlapped regions Ao between the pixels Pix and the spacers 36 is substantially equal (is equal) between the plurality of colors in part or all of the effective display region 211, not only the unevenness in luminance due to the moire phenomenon but also the unevenness in color due to the color moire phenomenon is reduced, leading to a further improvement in display image quality.

Furthermore, since the spacers 36 (so-called columnar spacers) provided (fixed) between the transparent substrates 33A and 33B are used as spacers for the liquid crystal barrier 30, density, positions, and size of the spacers are appropriately controlled, making it possible to overcome the above-described two difficulties of the dispersed spacers. Specifically, this provides sufficient resistance against the face pressing or the point pressing, and thus reduces the thickness of the panel, and reduces partial unevenness in display (yellowing) caused by local variation of cell gaps occurring in a stacking step and the like of the display section 20 and the liquid crystal barrier 30.

[Modifications]

Next, modifications (modifications 1 to 6) of the embodiment are described. The same components as those in the embodiment are designated by the same symbols, and description of them is appropriately omitted.

[Modification 1]

Figure 16A:
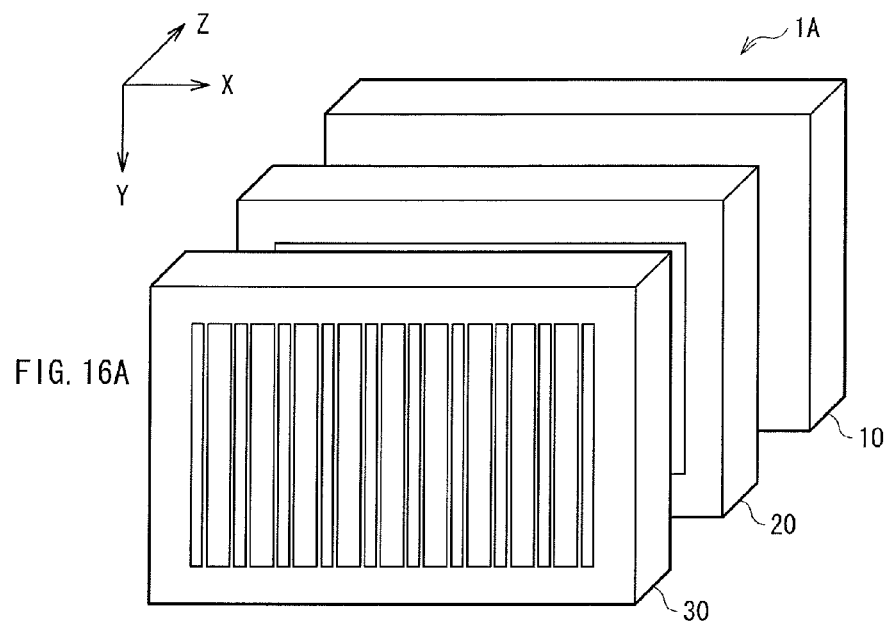
FIGS. 16A and 16B respectively are an exploded perspective view and a side view illustrating an exemplary overall configuration of a stereoscopic display device according to a modification 1.
Figure 16B:
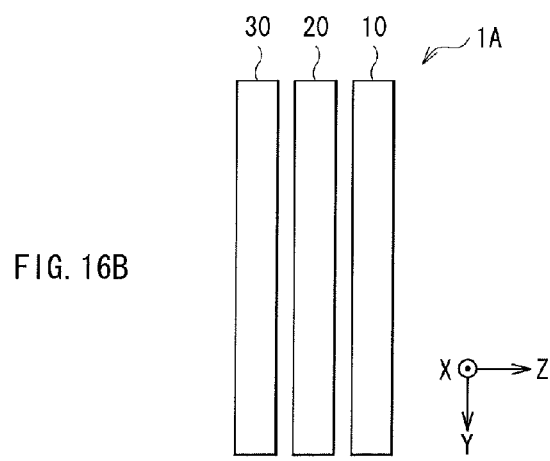

FIGS. 16A and 16B are an exploded perspective view (FIG. 16A) and a side view (Y-Z side view: FIG. 16B)), respectively, illustrating a general configuration of a display device (stereoscopic display device 1A) according to modification 1.

In the stereoscopic display device 1A of the modification, a backlight 10, a display section 20, and a liquid crystal barrier 30 are disposed in this order along a Z-axis direction, unlike the stereoscopic display device 1 of the embodiment. That is, light is emitted from the backlight 10 and received by a viewer through the display section 20 and the liquid crystal barrier 30 in this order.

Specifically, for example, when the stereoscopic display device 1A performs stereoscopic display 1 as shown in FIG. 17A, light is emitted from each of the pixels Pix in the display section 20, and outputted with an angle limited by each of the opening-and-closing sections 32A. Accordingly, a viewer is allowed to view a stereoscopic image through viewing pixel information P3 by his left eye and pixel information P4 by his right eye, for example. On the other hand, for stereoscopic display 2 as shown in FIG. 17B, light is emitted from each of the pixels Pix in the display section 20, and outputted with an angle limited by each of the opening-and-closing sections 32B. Accordingly, a viewer is allowed to view a stereoscopic image through viewing the pixel information P3 by his left eye and the pixel information P4 by his right eye, for example.

The stereoscopic display device 1A having such a configuration achieves the same advantages through the same effects as in the embodiment.

[Modifications 2 to 4]

Figures 18A, 18B, 18C:
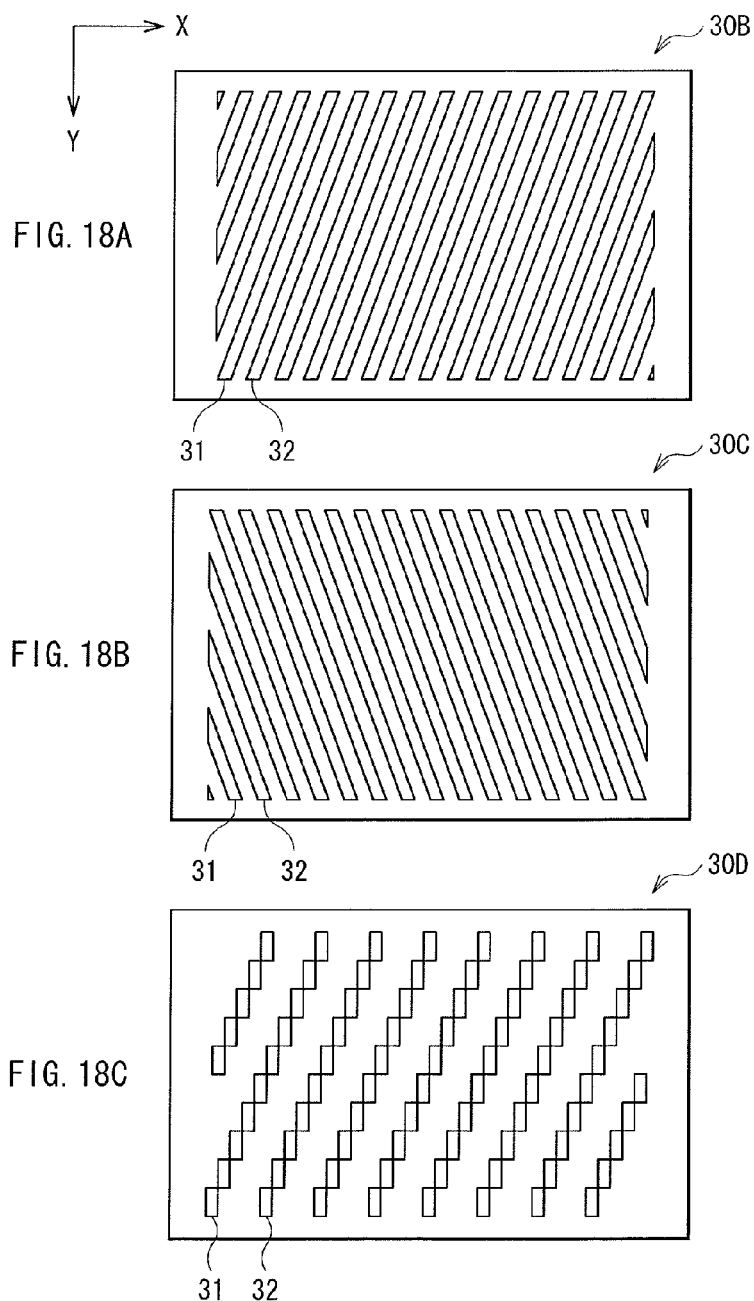
FIGS. 18A to 18C are plan views illustrating exemplary configurations of liquid crystal barriers according to modifications 2 to 4.

FIG. 18A illustrates a planar configuration of a liquid crystal barrier (liquid crystal barrier 30B) of a stereoscopic display device according to modification 2. FIG. 18B illustrates a planar configuration of a liquid crystal barrier (liquid crystal barrier 30C) of a stereoscopic display device according to modification 3. FIG. 18C illustrates a planar configuration of a liquid crystal barrier (liquid crystal barrier 30D) of a stereoscopic display device according to modification 4.

In the liquid crystal barriers 30B, 30C, and 30D according to the modifications 2 to 4, an extending direction of each of the opening-and-closing sections 31 and 32 is an oblique direction different from each of a horizontal line direction (X-axis direction) and a vertical line direction (Y-axis direction) of the display section 20 unlike the liquid crystal barrier 30 of the embodiment. Other configurations (configurations of the display section 20 and the backlight 10) of each stereoscopic display device are the same as those in the embodiment or the modification 1.

Specifically, the liquid crystal barriers 30B and 30C shown in FIG. 18A and 18B (modifications 2 and 3) each have a plurality of rectangular opening-and-closing sections 31 or 32 each extending in an oblique direction in a light barrier surface (an X-Y plane) (oblique-barrier type). In detail, the liquid crystal barrier 30B shown in FIG. 18A has the opening-and-closing sections 31 and 32 extending in an upper-right direction in the light barrier surface as viewed from a viewer. By contrast, the liquid crystal barrier 30C shown in FIG. 18B has the opening-and-closing sections 31 and 32 extending in an upper-left direction in the light barrier surface as viewed from a viewer.

On the other hand, the liquid crystal barrier 30D shown in FIG. 18C (modification 4) has the opening-and-closing sections 31 and 32 that generally extend stepwise in an oblique direction in the light barrier surface (X-Y plane) (stepped-barrier type). While the opening-and-closing sections extend in an upper-right direction as viewed from a viewer in this exemplary stepped-barrier type, the sections may extend in an opposite, upper-left direction as viewed from the viewer.

[Modifications 5 and 6]

Figure 19A:
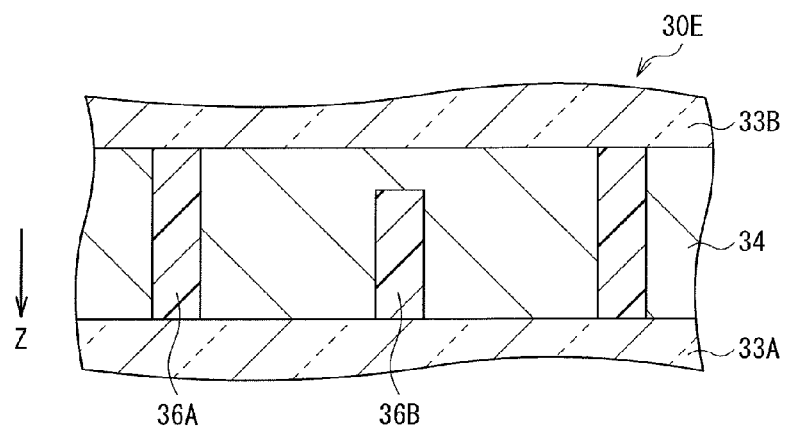
FIGS. 19A and 19B are sectional views illustrating exemplary schematic configurations of liquid crystal barriers according to modifications 5 and 6.
Figure 19B:
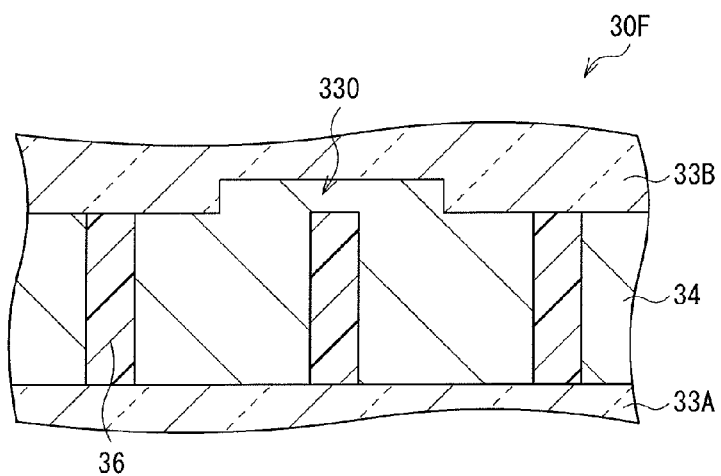

FIG. 19A schematically illustrates a sectional configuration of a liquid crystal barrier (liquid crystal barrier 30E) of a stereoscopic display device according to modification 5. FIG. 19B schematically illustrates a sectional configuration of a liquid crystal barrier (liquid crystal barrier 30F) of a stereoscopic display device according to modification 6.

The liquid crystal barriers 30E and 30F according to the modifications 5 and 6 each have a region where the spacers 36 are normally in contact with both the transparent substrates 33A and 33B, and a region where the spacers 36 are in contact with one of the transparent substrates 33A and 33B (here, the transparent substrate 33B) only when the spacers 36 are pressed. That is, in the liquid crystal barriers 30E and 30F, the light barrier region is divided into the above-described two regions depending on whether the spacers 36 are normally in contact with the transparent substrate 33B or not.

Specifically, in the liquid crystal barrier 30E schematically shown in FIG. 19A (modification 5), the spacers 36 include the following two types of spacers 36A and 36B, so that the light barrier region is partitioned into the above-described two regions. The spacers 36A are provided to be in contact with both the transparent substrates 33A and 33B from the first. The spacers 36B are provided (on the transparent substrate 33A) to be in contact with only the transparent substrate 33A from the first, and have a predetermined gap with the transparent substrate 33B from the first. Consequently, the neighborhood of the region having each spacer 36A includes a region where the spacer 36A are normally in contact with both the transparent substrates 33A and 33B, and the neighborhood of the region having each spacer 36B includes a region where the spacers 36B are in contact with the transparent substrate 33B only while being pressed.

In the liquid crystal barrier 30F schematically shown in FIG. 19B (modification 6), one of the transparent substrates 33A and 33B (here, the transparent substrate 33B) has predetermined recesses 330 (grooves, or an irregular structure) on a substrate surface thereof. As a result, the light barrier region is partitioned into the above-described two regions. Specifically, the spacers 36 are in contact with both the transparent substrates 33A and 33B from the first in regions having no recess 330 on the transparent substrate 33B (convex regions of the irregular structure). In regions having the recesses 330 on the transparent substrate 33B (concave regions of the irregular structure), the spacers 36 are provided to be in contact with only the transparent substrate 33A from the first, and provided to have a predetermined gap with the transparent substrate 33B from the first due to the recesses 330. Consequently, the neighborhood of the region having no recess 330 includes a region where the spacer 36 are normally in contact with both the transparent substrates 33A and 33B, and the neighborhood of the region having each recess 330 includes a region where the spacers 36 are in contact with the transparent substrate 33B only while being pressed.

In the modification 5 and 6 having such configurations, the liquid crystal barriers 30E and 30F reduce troubles (occurrence of impact bubbles or the like) due to the spacers 36, 36A, 36B, which are normally provided at a high density (arrangement density), while maintaining the resistance against external pressure.

[Other Modifications]

While the disclosure has been described with the embodiment and the modifications hereinbefore, the disclosure may be variously modified or altered without being limited to the embodiment and the like.

For example, while the embodiment and the like have been described with a case where the video signal S0 includes six eyepoint images, this is not limitative. For example, the signal may include five or less eyepoint images or seven or more eyepoint images.

In addition, while the embodiment and the like have been specifically described with the exemplary arrangement configuration of the spacers 36 in the liquid crystal barrier 30, the arrangement configuration of the spacers 36 is not limited to those described in the embodiment and the like, and other arrangement configurations, in which the spacers 36 are randomly arranged, may be used.

Furthermore, while the embodiment and the like have been mainly described with a case where a plurality of pixels Pix in the display section 20 include pixels corresponding to a plurality of colors (a multicolor pixel structure), this is not limitative. Specifically, the pixels Pix in the display section 20 may include pixels corresponding to a single color (a mono pixel structure).

In addition, while the embodiment and the like have been described with the case where the opening-and-closing sections 32A and 32B are time-divisionally alternately opened for image display, this is not limitative. The display section may display a plurality of kinds of eyepoint images only in a space-divisional manner.

In addition, while the embodiment and the like have been described with the case where the display section 20 is configured of a liquid crystal display section and the backlight 10 is provided as a light source, this is not limitative. Specifically, another type of display section, for example, a self-luminous display section such as an organic electro luminescence (EL) display or a plasma display panel (PDP), can be provided in place of the display section 20 and the backlight 10.

The present disclosure contains subject matter related to that disclosed in Japanese Priority Patent Application JP 2011-056691 filed in the Japan Patent Office on Mar. 15, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display device comprising:
a display section;
a backlight; and
a light barrier section between the display section and the backlight, the light barrier section having a plurality of light barrier sub-regions that selectively transmit or block transmission of the light therethrough,
wherein
the light barrier section includes (a) a pair of substrates, (b) a liquid crystal layer between the pair of substrates and (c) a plurality of spacers formed on one of the substrates and positioned between the pair of substrates, and the plurality of spacers are positioned randomly across a region between the substrates.

2. The display device according to claim 1, wherein:
the display section includes a display region and a plurality of pixels across the display region, and
an arrangement of the plurality of spacers is non-periodical with respect to an arrangement of the plurality of pixels.

3. The display device according to claim 2, wherein the respective spacers are irregularly positioned with respect to the pixels.

4. The display device according to claim 2, wherein:
the plurality of pixels includes pixels corresponding to a plurality of colors, and
an amount of area of overlap of the spacers and the pixels is substantially equal for each color throughout the display region.

5. The display device according to claim 4, wherein the total amount of area of overlap of the spacers and the pixels is substantially equal for each color across the region between the light barrier section substrates.

6. The display device according to claim 4, wherein the total area of overlap of the spacers and the pixels is substantially equal for pixels of each color across the entire display region.

7. The display device according to claim 4, wherein the pixels corresponding to the plurality of colors comprise red (R) pixels, green (G) pixels, and blue (B) pixels.

8. The display device according to claim 1, wherein:
the region between the light barrier substrates is partitioned into a plurality of unit regions, and
the plurality of spacers are positioned randomly in each of the unit regions.

9. The display device according to claim 1, wherein the plurality of spacers are positioned randomly across the entirety of the region between the light barrier substrates.

10. The display device according to claim 1, wherein the plurality of spacers are fixed between the pair of light barrier substrates.

11. The display device according to claim 1, wherein the plurality of spacers each have a columnar shape.

12. The display device according to claim 1, wherein the display section comprises a liquid crystal display section.

13. A display device comprising:
a backlight;
light barrier element comprising (a) a pair of substrates, (b) a liquid crystal layer that is between the pair of substrates and has a plurality of sub-regions that selectively transmit or block light, and (c) a plurality of spacers formed on one of the substrates and provided between the pair of substrates; and
a display between the backlight and the light barrier element,
wherein,
the plurality of spacers are positioned randomly across a region between the substrates.

* * * * *